(12) United States Patent
Taub

(10) Patent No.: US 9,523,355 B2
(45) Date of Patent: Dec. 20, 2016

(54) FLOATABLE TRANSPORTATION AND INSTALLATION STRUCTURE FOR TRANSPORTATION AND INSTALLATION OF A FLOATING WIND TURBINE, A FLOATING WIND TURBINE AND METHOD FOR TRANSPORTATION AND INSTALLATION OF THE SAME

(71) Applicant: Mecal Wind Turbine Design B.V., Enschede (NL)

(72) Inventor: Eyal Moshe Taub, Enschede (NL)

(73) Assignee: MECAL WIND TURBINE DESIGN B.V., Enschede (NL)

( * ) Notice: Subject to any disclaimer, the term of this patent is extended or adjusted under 35 U.S.C. 154(b) by 0 days.

(21) Appl. No.: 14/440,624

(22) PCT Filed: Nov. 5, 2013

(86) PCT No.: PCT/NL2013/050790
§ 371 (c)(1),
(2) Date: May 5, 2015

(87) PCT Pub. No.: WO2014/073956
PCT Pub. Date: May 15, 2014

(65) Prior Publication Data
US 2015/0252791 A1  Sep. 10, 2015

(30) Foreign Application Priority Data
Nov. 6, 2012  (NL) .................................. 2009763

(51) Int. Cl.
*E02B 17/00*  (2006.01)
*B63B 35/00*  (2006.01)
(Continued)

(52) U.S. Cl.
CPC ............. *F03D 11/045* (2013.01); *B63B 1/107* (2013.01); *B63B 21/50* (2013.01); *B63B 35/003* (2013.01);
(Continued)

(58) Field of Classification Search
CPC ............ B63B 35/003; E02B 2017/0039; E02B 2017/0091
(Continued)

(56) References Cited

U.S. PATENT DOCUMENTS 8,016,519 B2 *  9/2011  Bingham ................ B63B 27/10
                                                       405/204
8,701,579 B2 *  4/2014  Roodenburg ......... B63B 35/003
                                                        114/61.1
(Continued)

FOREIGN PATENT DOCUMENTS

DE  102010009466 A1 *  9/2011  ............. B63B 1/107
EP      1666722 A1      7/2006
(Continued)

*Primary Examiner* — Frederick L Lagman
(74) *Attorney, Agent, or Firm* — Hoffmann & Baron, LLP

(57) ABSTRACT

The present invention relates to a floatable transportation and installation structure for transportation and installation of an essentially fully assembled and erected floating wind turbine, wherein said transportation and installation structure is comprising securing means for detachably and temporarily securing the floatable transportation and installation structure to the erected floating wind turbine in such a way that the floating wind turbine is stabilized and can be moved by moving the transportation and installation structure.

Further, the invention relates to a floating wind turbine comprising securing counter means connectable to securing means of a floatable transportation and installation structure (Continued)

according to the before mentioned kind and to a method of transportation and installation of such a floating wind turbine.

12 Claims, 19 Drawing Sheets

(51) Int. Cl.
| | |
|---|---|
| F03D 11/04 | (2006.01) |
| B63B 21/50 | (2006.01) |
| E02B 17/02 | (2006.01) |
| E02B 17/04 | (2006.01) |
| E02D 27/50 | (2006.01) |
| E02D 27/52 | (2006.01) |
| B63B 1/10 | (2006.01) |
| B63B 35/44 | (2006.01) |
| B63B 1/12 | (2006.01) |

(52) U.S. Cl.
CPC .............. *B63B 35/44* (2013.01); *E02B 17/02* (2013.01); *E02B 17/04* (2013.01); *E02D 27/50* (2013.01); *E02D 27/52* (2013.01); *F03D 13/22* (2016.05); *B63B 2001/128* (2013.01); *B63B 2021/505* (2013.01); *B63B 2035/446* (2013.01); *E02B 2017/0039* (2013.01); *E02B 2017/0047* (2013.01); *E02B 2017/0091* (2013.01); *E02B 2017/0095* (2013.01); *F05B 2240/93* (2013.01); *F05B 2240/95* (2013.01); *Y02E 10/721* (2013.01)

(58) Field of Classification Search
USPC .................................................. 405/206, 209
See application file for complete search history.

(56) References Cited

U.S. PATENT DOCUMENTS

| | | | |
|---|---|---|---|
| 8,820,254 B2* | 9/2014 | Tosello | B63B 9/065 114/61.1 |
| 2009/0028647 A1 | 1/2009 | Bingham et al. | |
| 2010/0316450 A1* | 12/2010 | Botwright | B63B 35/00 405/206 |
| 2011/0139056 A1* | 6/2011 | Cholley | B63B 27/04 114/264 |
| 2012/0183359 A1 | 7/2012 | Nordstrom et al. | |
| 2012/0189390 A1* | 7/2012 | Belinsky | F03D 11/045 405/204 |
| 2012/0219364 A1* | 8/2012 | Li | F03D 1/005 405/209 |
| 2012/0255478 A1* | 10/2012 | Hadeler | B63B 27/12 114/61.31 |
| 2013/0051924 A1* | 2/2013 | Willis | F03D 1/001 405/195.1 |

FOREIGN PATENT DOCUMENTS

| | | | | |
|---|---|---|---|---|
| GB | 2454585 A | | 5/2009 | |
| JP | 2010115978 | | 5/2010 | |
| JP | 2011112044 | | 6/2011 | |
| JP | 2011525223 | | 9/2011 | |
| JP | 2011207446 | | 10/2011 | |
| JP | 201211845 | | 1/2012 | |
| JP | 201256333 | | 3/2012 | |
| JP | 2012201191 | | 10/2012 | |
| WO | 03/066427 A1 | | 8/2003 | |
| WO | WO2006038091 A2 | | 4/2006 | |
| WO | WO 2009153530 A2 * | | 12/2009 | ............ B63B 27/04 |
| WO | 2012/097283 A2 | | 7/2012 | |
| WO | WO2012103796 A1 | | 9/2012 | |

* cited by examiner

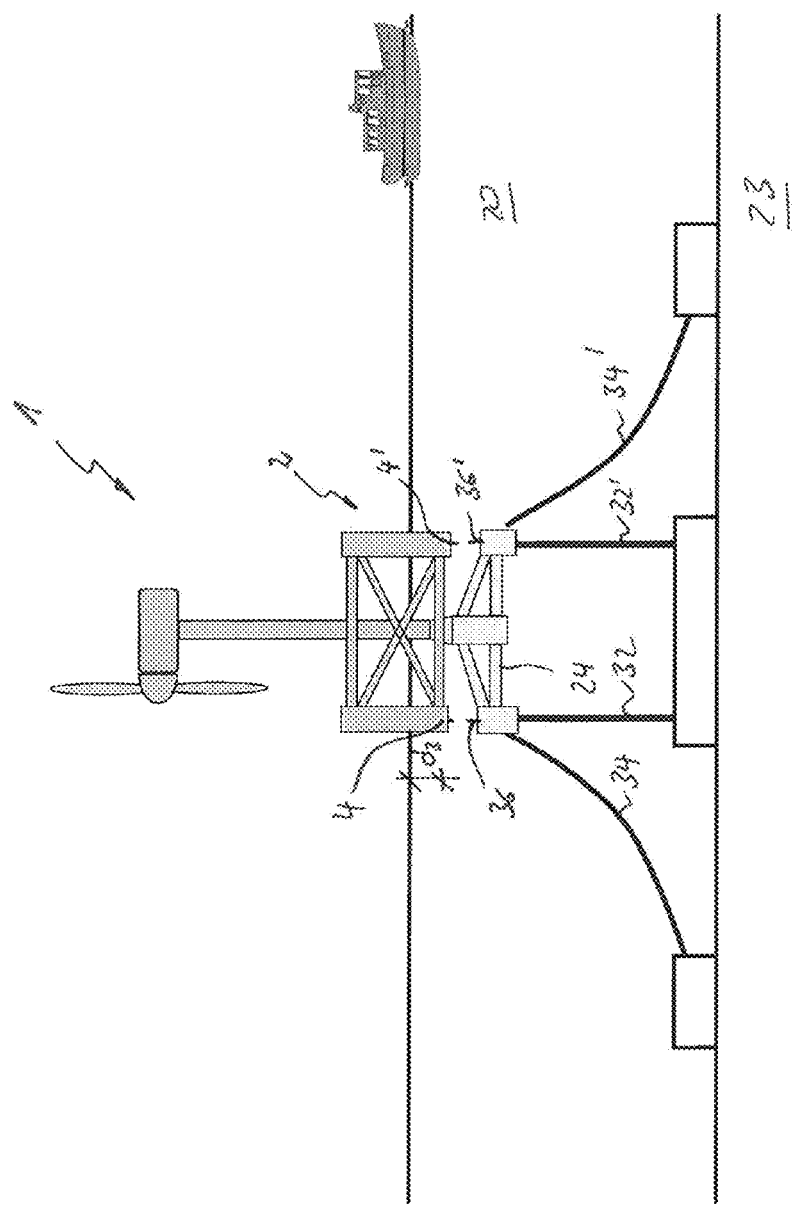

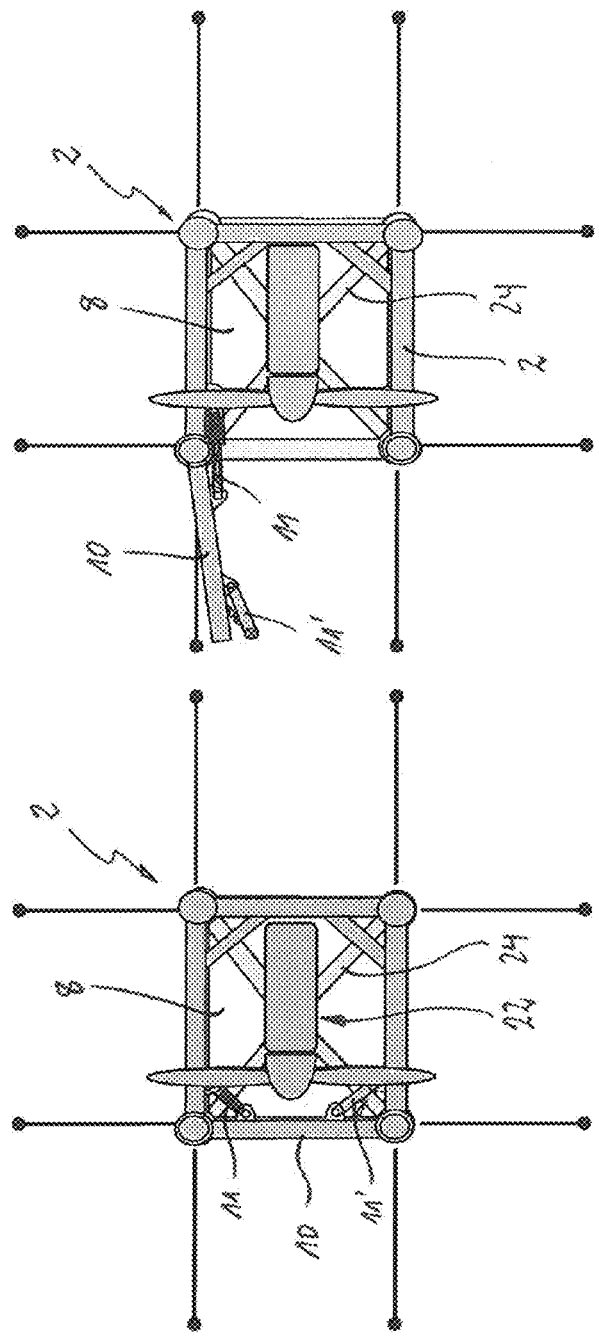

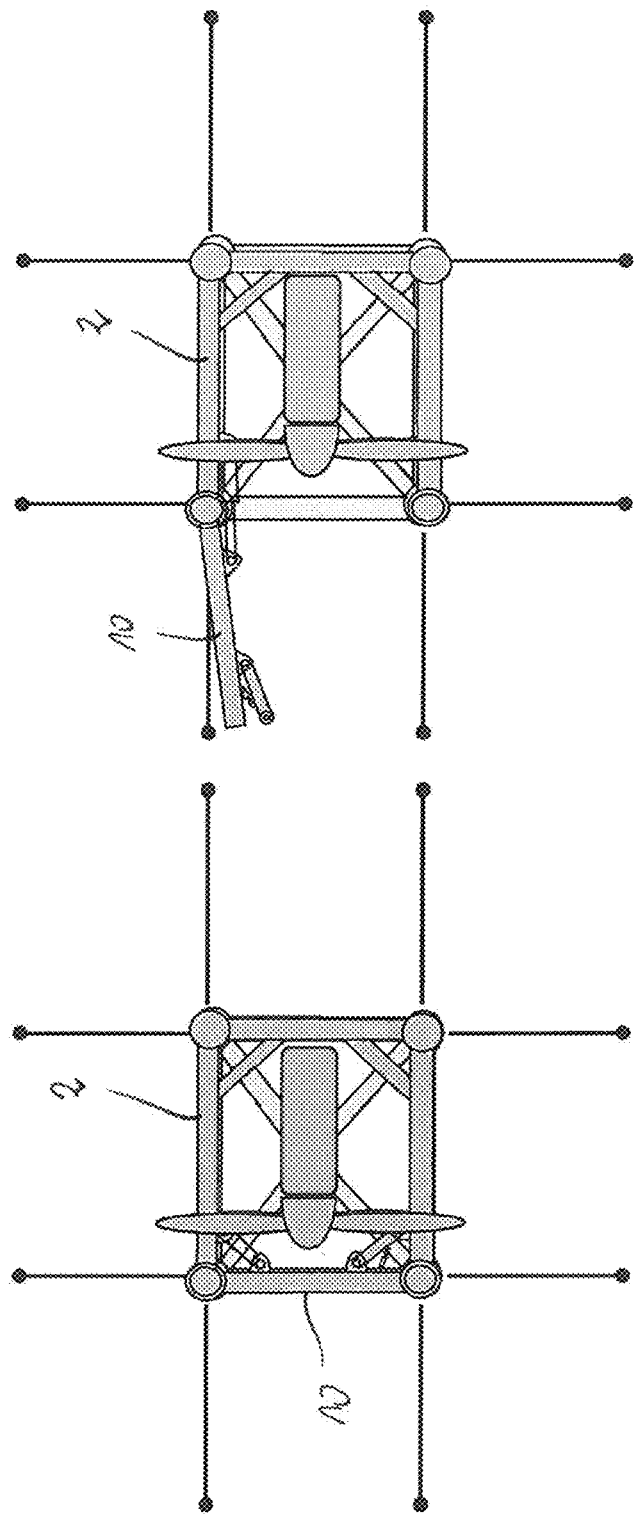

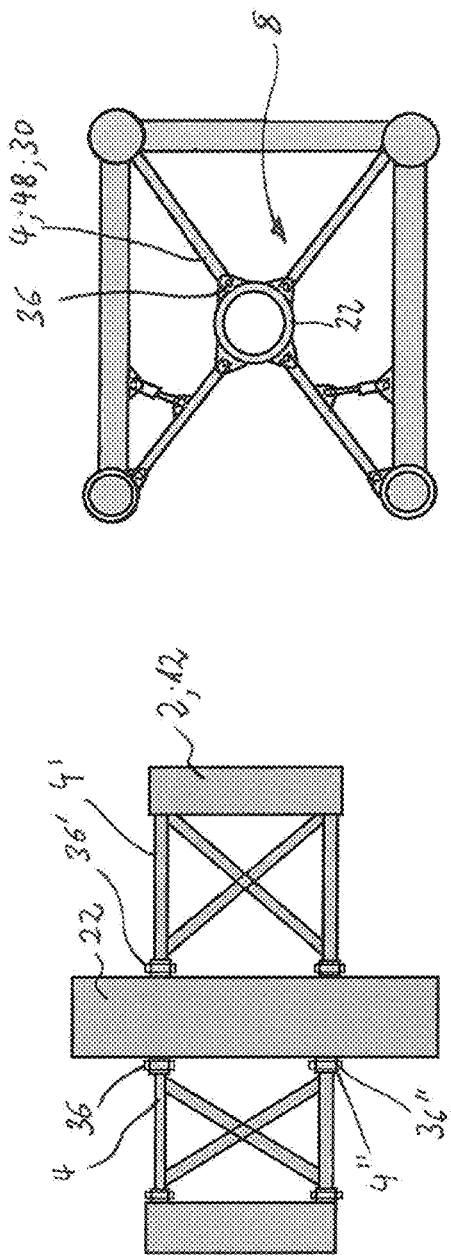

FLOATABLE TRANSPORTATION AND INSTALLATION STRUCTURE FOR TRANSPORTATION AND INSTALLATION OF A FLOATING WIND TURBINE, A FLOATING WIND TURBINE AND METHOD FOR TRANSPORTATION AND INSTALLATION OF THE SAME

CROSS-REFERENCE TO RELATED APPLICATIONS

This application is the U.S. National Phase of, and Applicants claim priority from, International Patent Application Number PCT/NL2013/050790 filed Nov. 5, 2013, which claims priority from NL 2009763 filed Nov. 6, 2012, each of which is incorporated herein by reference.

FIELD OF THE INVENTION

The present invention relates to a floatable transportation and installation structure for transportation and installation of an essentially fully assembled and erected floating wind turbine.

Further, the invention relates to such a wind turbine securable to such a floatable transportation and installation structure.

Finally, the invention relates to a method for transportation and installation of an essentially fully assembled and erected floating wind turbine.

In detail, the present invention relates to a transportation and installation method and structure for an offshore wind turbine and in particular to floating offshore wind turbines with tension leg platform (TLP) type support structures.

BACKGROUND OF THE INVENTION

Recently, the offshore wind industry has grown at a rapid rate due to the higher wind speeds found at sea. However, due to the nature of the water and the weather conditions, the assembly and installation of offshore wind turbines has proved to be difficult and expensive. In order to reduce the cost and simplify the installation, some offshore wind turbines are being essentially fully assembled onshore, transported to the offshore site and then connected to the pre-installed offshore foundation. These pre-installed foundations would be constructions which are built into the sea-bed such as a monopile, jacket, tripod or suction caisson foundations.

Specialist vessels are required to transport the pre-assembled wind turbines and to upend them at the offshore site. Offshore cranes or other specialist lifting devices are then required to lift the wind turbine and lower it onto the pre-installed foundation. The need for specialist vessels, lifting devices and offshore cranes adds significantly to the overall expense of an offshore wind farm. The largest expense is the cost of the pre-installed offshore foundations and their installation.

For this reason, the offshore wind turbine industry is now moving towards floating turbines which can be developed to be essentially fully assembled onshore and transported upright to the site in order to be anchored. This is an improvement on the high costs and lengthy installation of an offshore foundation. The key feature of a floating wind turbine is the support structure. The main floating wind turbine support structures can be categorized into three groups: spar buoy, semi-submersible and TLP.

All three groups deal with the problem of stabilizing the floating wind turbine against the horizontal, vertical and rotational movements to which it is subjected after installation.

A semi-submersible is a partially submerged structure that is stabilized by the buoyancy of watertight containers that are fully submerged in the water. However, this means that semi-submersibles rely on a large water-plane area to stabilize the structure against the changing loads such as those resulting from the operation of the wind turbine. Therefore the dimensions of the semi-submersibles are very large.

A spar buoy structure for a floating turbine is stabilized by ballasting. The spar relies on a ballasted deep-draft hull to stabilize the floating wind turbine. This requires deep water depths of over 100 m. The structures are also very heavy and costly with the possibility of reduction in weight being highly unlikely. Due to the length of the spar structure, onshore assembly of the full turbine and support structure is probably not possible which increases the cost further due to the offshore cranes, lifting devices or specialist transport vessels required.

With regard to a TLP structure, vertical motions are eliminated by the tension-leg mooring system in which the tendons are anchored to the sea bed. This stability provided by the tendons, allows the platform size to be significantly reduced and it is therefore lighter and less expensive. In addition the structure can be fully submerged in order to reduce wave loads.

The most versatile and cost-effective of the support structures mentioned before is the TLP structure. The complete TLP system is such that the support structure is smaller and much less expensive than a semi-submergible and a spar buoy. However, the biggest problem involved is in the cost and complexity of transportation and installation of the TLP structure wind turbine due to its instable nature outside of its installed form which means that without anchoring the floating wind turbine to the sea bed, wind and water forces have a drastic impact on the buoyancy stability of the TLP based floating wind turbine.

Principally, there are two obvious solutions for the installation of a wind turbine with a TLP support structure, known from the state of art:

The first solution is to transport and install the whole TLP structure, namely the support structure, the tendons, the anchors, the wind turbine and the tower, all separately. However, the cost and amount of time required for this solution are considerably large.

The second solution is to make the TLP support structure larger and more complex in order for it to be able to support a fully assembled wind turbine during transportation by towing it to the installation site. However, this defeats the purpose of a TLP structure and would be closer in design and function to a semi-submersible structure.

In addition to floating wind turbines mentioned above, there is a type of offshore foundation that is classed as a gravity base foundation which also offers some of the advantages such as onshore assembly and shorter installation times at the site. This type of foundation generally does not require any drilling into the sea-bed or pre-installation and therefore the transportation and installation of wind turbines with gravity base foundations can essentially be compared to that of floating wind turbines.

There are existing examples of the transportation and installation of support structures for floating wind turbines and essentially fully assembled offshore wind turbines, for example the "Blue H" (TLP), Cowi (gravity base foundation) and GBF (gravity base foundation). These structures are known to the skilled person, however, they have several disadvantages, e.g. very time-consuming and labor-intensive installation, bulky and difficult to handle transportation means, large dimensions due to the level of support required of the structures, solely compatible with the support structure for which they are designed, very high installation costs. In addition, the known state of the art comprises installation or transportation structures made up of several separate units that do not form a single, self-supporting and independent structure.

BRIEF SUMMARY OF THE INVENTION

It is therefore an object of the invention to provide a cost-effective means and method of transportation and installation for a floating wind turbine and especially for a floating wind turbine with a TLP support structure.

The above object is reached by a floatable transportation and installation structure for transportation and installation of an essentially fully assembled and erected floating wind turbine, a floating wind turbine and by a method for transportation and installation of an essentially fully assembled and erected floating wind turbine according to the independent claims.

In detail, the object is reached by a floatable transportation and installation structure for transportation and installation of an essentially fully assembled and erected floating wind turbine, wherein said transportation and installation structure comprises securing means for detachably and temporarily securing the floatable transportation and installation structure to the erected floating wind turbine in such a way that the floating wind turbine is stabilized and can be moved by moving the transportation and installation structure.

Further, the above object is reached by a floating wind turbine comprising counter securing means connectable to securing means of a floatable transportation and installation structure as defined within this specification.

Finally, the above object is reached by a method for transportation and installation of an essentially fully assembled and erected floating wind turbine, comprising: Securing the essentially fully assembled and erected floating wind turbine to a floatable transportation and installation structure in such a way that the erected floating wind turbine is stabilized and can be moved by moving the transportation and installation structure; transporting the floating wind turbine to a designated position by moving the floatable transportation and installation structure to said designated position; securing the floating wind turbine to fixation means provided at the designated position; detaching the transportation and installation structure from the now fixed floating wind turbine and separating it from the wind turbine.

A key aspect of the invention is the use of a preferably reusable floatable transportation and installation structure which can be attached to a floating wind turbine in such a way that the wind turbine can be essentially fully assembled and, which is even more relevant, that the wind turbine can be moved in an erected state. This means that the wind turbine can be assembled onshore by use of provided onshore cranes and additional necessary equipment, wherein no offshore equipment for lifting or moving the wind turbine is necessary except for tugboats or similar standard moving equipment. In this regard essentially fully assembled therefore means that the floating wind turbine is assembled in such a way that offshore installation can be done without use of any expensive offshore equipment for lifting and moving except for tugboats or similar standard moving and lifting equipment.

Preferably, the floatable transportation and installation structure is secured to the erected floating wind turbine in a manner that it can be moved along a horizontal axis to a designated position offshore, where for example the floating wind turbine has to be installed. Furthermore, it is possible that the floatable transportation and installation structure also allows vertical movement of the floating wind turbine, which is explained further along in the description. This vertical movement helps, for example, when attaching the floating wind turbine and its floating support structure to the tendons of a TLP support structure.

Temporarily connecting the floatable transportation and installation structure to the floating wind turbine allows reusability of the transportation and installation structure reducing installation costs tremendously. In theory, any securing means known from the state of the art may be used, however, the present invention preferably utilizes temporary connecting or securing means which are easily disconnected or detached when required. Therefore the invention presumes to exclude connecting means such as welding or similar securing means which are known in the state of the art and for which detaching the wind turbine from the floatable transportation and installation structure would be significantly more complex.

In detail, the structure preferably provides a reusable, towable, semi-submersible transportation and installation structure which comprises a pre-assembled single unit that is easily attached to and detached from the floating wind turbine and/or TLP support structure or similar parts.

Furthermore, as all necessary installation and moving means can be provided by the reusable floatable transportation and installation structure, the cost of the floating wind turbines can be reduced. An example of this case is that no separate ballasting or moving means are required in addition to the transportation and installation structure as detailed in the present invention.

Preferably, the floatable transportation and installation structure is a passive structure comprising no active traction means, and especially no motor, however, preferably comprising connection means for being connected to at least one active traction means and especially a tugboat. This reduces the cost of the actual floatable transportation and installation structure and only requires standard and relatively inexpensive active traction means such as a tugboat. The use of a tugboat is the most advantageous especially as it is most likely already present during the installation and construction of an offshore wind farm. The multi-purpose use of existing support means such as tugboats would further reduce costs.

Preferably, the floatable transportation and installation structure comprises ballastable and de-ballastable means configured in such a way that the floating depth of the floatable transportation and installation structure is adaptable by ballasting and de-ballasting the respective means, and especially by taking in sea water and ejecting sea water respectively. Preferably, the ballasting or de-ballasting can be carried out in a situation where the floatable transportation and installation structure is secured to the floating wind turbine and/or in a situation where it is separated from the floating wind turbine.

The transportation and installation structure can preferably be lowered by ballasting resulting in the lowering of the floating wind turbine and its support structure together with the floatable transportation and installation frame. Conversely, the floatable transportation and installation structure is de-ballastable resulting in the lifting of the floatable transportation and installation structure, thereby preferably also lifting the attached floatable wind turbine.

In the case of the aforementioned TLP structure, it is therefore possible to ballast the floatable transportation and installation structure, to lower it in the water and to also lower the attached floating wind turbine, and then attach anchored tendons and catenary mooring lines or similar TLP fixation means to the lowered floating wind turbine or the floating support structure of the floating wind turbine respectively. After attaching the floating wind turbine to these TLP fixation means, it is then possible to detach the floatable transportation and installation structure from the now fixed floating wind turbine, de-ballast the floating transportation and installation structure in order to lift it, thereby separating it from the fixed floating wind turbine.

In other words, the floatable transportation and installation structure is ballastable and de-ballastable to submerge and especially preferably fully submerge the floating support structure of the wind turbine. These ballastable and de-ballastable floating means could also be useful when towing the attached transportation and installation structure and floating wind turbine through rough sea and stormy weathers, in order to adapt the damping and the stabilization of the (non-fixed) arrangement or to adapt the hydraulic resistance during transport.

After separating the wind turbine, now fixed to the seabed or a corresponding fixture, the floatable transportation and installation structure can be de-ballasted, thereby reducing its floating depth inter alia resulting in reduced transportation costs due to reduced hydraulic resistance.

It is therefore preferred that the floatable transportation and installation structure can be ballasted in such a way that the wind turbine and especially their floating support structure is lowered in the water so that the floating wind turbine and the floating support structure respectively can be anchored to the sea bed.

Furthermore, it is preferred that the floatable transportation and installation structure is de-ballastable in such a way that its floating depth can be adjusted in order to separate it from the fixed floating wind turbine and/or to reduce the hydraulic resistance during transportation and especially during towing by a tugboat.

Preferably, the floatable transportation and installation structure comprises an accommodation area where the floating wind turbine can be accommodated in such a way that the floatable transportation and installation structure is at least partially enclosing the floating wind turbine. This accommodation area preferably provides fixation points for fixation of the wind turbine to the floatable transportation and installation structure whereby the fixation is simple and efficient. Furthermore, such an accommodation area ensures secure support of the erected floating wind turbine and its floating support structure respectively, even under rough weather conditions, with minimal risk of damage to the wind turbine tower.

Preferably, the accommodation area and the floatable transportation and installation structure respectively are built in such a way that especially a tower of the floating wind turbine is at least partially enclosed. Such a tower can for example be a tower carrying at a top end a nacelle of a horizontal axis wind turbine. However, it can also be a tower-element or similar element carrying a vertical axis wind turbine arrangement.

Preferably, the floatable transportation and installation structure comprises at least one opening-closing structure or similar gate structure for reversibly essentially fully enclosing the accommodation area around the floating wind turbine. Such a gate structure can for example be a gate which can be opened and closed protecting the floating wind turbine inside the accommodation area and preferably allowing the separation of the floating wind turbine to and from the floatable transportation and installation structure by providing an opening in the structure. This is particularly efficient when detaching the floating wind turbine at the offshore site.

Preferably, said gate structure applies to at least one sidewall of the transportation and installation structure, whereby the floatable transportation and installation structure can be placed around the essentially fully assembled upright wind turbine for transportation and removed from around said wind turbine after installation without having to lift said turbine or unassembled the transportation and installation structure. Generally, the floatable transportation and installation structure is built in such a way that attaching, detaching and separating the floating wind turbine to and from the floatable transportation and installation structure is possible without any lifting means for lifting the wind turbine. This means that the wind turbine can be built and installed in a very effective and economical way and especially without any ballastable means needed to be incorporated into the floating wind turbine support structure. The ballastable means would therefore only be provided as part of the floatable transportation and installation structure.

Preferably, the floatable transportation and installation structure is built in such a way that it is positionable and/or securable, at least partially, on a top part of the floating support structure. By placing the transportation and installation structure on top of the floating support structure and around the wind turbine base respectively, the transportation and installation structure does not need to be engineered to support the whole arrangement to be transported and efficient use is made of the buoyancy of the existing floating support structure.

Generally it is of advantage that the buoyant or floating support structure of the wind turbine does not need to be made ballastable and its buoyancy is utilized efficiently. Flexibility, ballasting and/or other expensive features with regard to manufacturing and technology can all be put on the reusable transportation and installation structure in order to reduce the costs of the floating wind turbine and its anchors. The overall cost of wind farms would then be reduced due to the repeated usage of the floatable transportation and installation structure.

Preferably, the floatable transportation and installation structure comprises a frame structure and especially a lattice structure.

In keeping with the invention thus far, this frame or lattice structure preferably also has an enclosable accommodation area for attaching the floating wind turbine. By providing a frame-like transportation and installation structure, the use of excess material and weight are reduced resulting in a very cost-effective easy to assemble and easy to handle floatable transportation and installation structure. This is especially the case when the frame structure is a made up of tubular elements.

Preferably, the floatable transportation and installation structure and especially the frame structure comprise hollow chambers and especially tubular elements comprising the ballastable and de-ballastable floating means. Hollow parts of the transportation and installation structure and especially of the frame, or separate stabilizing units, can be made ballastable to weigh the structure down and stabilize the wind turbine during transportation. It could also make the anchoring of the floating wind turbine easier, as mentioned before, by lowering the entire structure in order to connect the tendons or the catenary mooring lines of the TLP or similar fixation means. The structure is preferably lowered to a distance so that the tendons and/or the mooring lines slack and therefore can easily be connected.

Of course, these hollow chambers or floating means could also be separate hollow chambers or floating means which can be attached to the floatable transportation and installation structure if necessary. In this case, respective attaching means are provided, for example bolt connections or similar. These hollow chambers or floating means would be watertight and be ballastable and de-ballastable individually.

As mentioned before, the frame could itself comprise the gate structure for opening and closing the accommodation area. Also, it is possible to provide a floatable transportation and installation structure and especially a frame structure with at least one open side in order to reduce the need for gates and extra handling of the same. Alternatively, the sides of the frame or floatable transportation and installation structure respectively may be opened using hydraulics or similar mechanisms which do not require the gate to be manually opened by divers, which are an expensive addition to current offshore installation methods. With regard to the opening and closing of the gate structure, all relevant techniques and especially drive mechanisms are usable.

After installation, the floatable transportation and installation structure and especially the frame can be, as mentioned before, de-ballasted, detached and especially unbolted from the floating wind turbine and the gate, if provided, can be opened in order to remove the frame from around the wind turbine and especially tow the structure back to shore with no need for offshore cranes and minimal need, if any, for divers.

Preferably, the floatable transportation and installation structure is reusable for transportation and installation of multiple floating wind turbines. This has been mentioned before. Furthermore, it is possible to provide adapter means so that the floatable transportation and installation structure can be used for the transportation and installation of different kinds of floating wind turbines, wherein the adapter means are used to make the fixation means of the transportation and installation structure compatible with counter fixation means of the floating wind turbine to be transported and installed.

Generally, these fixation and counter fixation means can be chosen by a person skilled in the art from known techniques and methods. Here, bolt connections, hydraulic clamping, screw connections or similar connections are all applicable, as well as welding or other such methods.

The connection between the transportation and installation structure and the wind turbine is intended to be as simple as possible to connect and disconnect in terms of the time and labor required. The floatable transportation and installation structure could be attached to the floating wind turbine and a TLP buoyancy support structure respectively by bolt connection plates. The connection pieces could then be retrofitted onto different support structures in order for the floatable transportation and installation structure to be used for more than one type of floating wind turbine and support structure respectively.

As mentioned before, the floatable transportation and installation structure therefore preferably comprises adapter means for securing different kinds of floating wind turbines to it for transportation and installation.

Preferably, the floatable transportation and installation structure is built as a modular structure comprising multiple parts and especially frame-like parts, having designs and dimensions such that they are attachable with each other and can be combined in various arrangements whereby the floatable transportation and installation structure can be adapted for transportation and installation of different kinds of floating wind turbines. In this case, especially with regard to a frame structure and a lattice structure, different kinds of tubular elements, having different size and especially length can be used and attached together to build the floatable transportation and installation structure.

In other words, the proposed structure could be made more versatile especially by having a frame and tubular structure respectively which would be suited to a modular design. The frames would usually be built specifically for the transport and installation of at least one special kind of floating wind turbine-after they have been used for the installation of one wind farm they would probably be saved for the next installation of exactly the same wind turbine or scrapped/recycled for other purposes.

If the frames are modular, they are adaptable to different wind turbines and TLP or similar support structures respectively. The horizontal and vertical length of such tubular steel and similar frame structures would for example easily be connected with connecting pieces whilst diagonal length would be made flexible by hinged connections to the horizontal/vertical length.

Floating turbines require fixation means which allow them to be positioned in a specific location. As mentioned previously, the TLP structure includes fixation means by which the floating wind turbine can be fixed at an offshore site. These TLP fixation means include tendons, tendon anchoring means, catenary mooring lines, catenary mooring line anchoring means etc. Therefore, the floatable transportation and installation structure preferably comprises attachment means for some or the entire fixation means to be temporarily fixed to said structure during transportation. In other words, the floatable transportation and installation structure and/or the floating wind turbine comprise fixing means so that they can at least partly carry their own fixation means to the position where they are fixed to the sea bed. This provides an all-in-one installation system which is cheap and fast to install.

As mentioned before, the invention also relates to a floating wind turbine comprising counter securing means connectable to securing means of a floatable transportation and installation structure as mentioned before. In this regard all features disclosed in this specification are applicable to the floating wind turbine also.

The floating wind turbine preferably further comprises a floating support structure and at least one wind turbine arrangement attached to the floating support structure, wherein the floating support structure is not comprising ballasting and de-ballasting means and is especially not ballastable and de-ballastable by taking and/or ejecting water or similar ballast means. Although transporting a floating turbine with a TLP support structure and installing and anchoring it at the designated site is complex and laborious, by use of the aforementioned floatable transportation and installation structure, easy transport and installation is possible, resulting in a very economical production of wind turbines.

Preferably the floating wind turbine comprises attachment means for at least temporarily attaching some or all of the fixation means, by which the floating wind turbine can be fixed at an installation position offshore, during transportation to this position. When said floating support structure of the floating wind turbine comprises at least parts of a tension leg platform type foundation further comprising tendons connected to tendon anchoring means and/or catenary mooring lines connected to mooring lines anchoring means, the floating wind turbine and especially the floating support structure preferably comprises attachment means of at least part of the anchoring means to be temporarily fixed to said wind turbine during transportation. As mentioned before with regard to the floatable transportation and installation structure, such a floating wind turbine comprises attachment means to temporarily attach TLP or other fixation means, namely anchoring means, tendons or catenary mooring lines, etc., to attach them to the floating wind turbine during transport. Such an arrangement can therefore easily provide all necessary parts for fixation of the floating wind turbine to the sea bed.

Of course, these attachment means could also be provided for the attachment and transportation of other fixation means for the fixation of other floating wind turbines known from the state of the art.

As mentioned before, the invention also relates to a method for transportation and installation of an essentially fully assembled and erected floating wind turbine especially a floating wind turbine as mentioned before comprising the following steps: securing the essentially fully assembled and erected floating wind turbine to a floatable transportation and installation structure in such a way that the erected floating wind turbine is stabilized and can be moved by moving the transportation and installation structure; moving the floating wind turbine to a designated position by moving the floatable transportation and installation structure to said designated position; securing the floating wind turbine to fixations means provided at the given position; detaching the transportation and installation structure from the now fixed floating wind turbine and separating it from the wind turbine.

Of course all other features mentioned in this specification can be transferred to the method and are therefore included.

Preferably, the method for transportation and installation further comprises: ballasting the floatable transportation and installation structure in such a way that the secured floating wind turbine is lowered further into the water; securing the lowered floating wind turbine to fixation means; separating the lowered floatable transportation and installation structure from the fixed floating wind turbine; and de-ballasting the floatable transportation and installation structure in such a way that it is lifted in the water.

In a special embodiment the method for transportation and installation of the floating wind turbine comprises the steps that the transportation and installation structure and especially a frame is placed around the wind turbine and especially around a tower of a wind turbine and preferably on top of the floating support structure of the same, using a gate or opening. The transportation and installation structure is then fixed to or onto the floating support structure with pre-existing fixing means, the floatable transportation and installation structure is connected to a tugboat or a similar transportation vessel and towed to the designated position, wherein the frame is supporting the wind turbine and preferably also the TLP support structures or similar fixation structures, e.g. anchoring means, connection lines or any other fixation means. The floatable transportation and installation structure is weighted further by ballasting, lowering the wind turbine so that the floating support structure is especially fully submerged, the submerged support structure respectively is attached to the fixation means and especially the TLP structure arranged before, wherein the frame is then detached from the floating support structure, its ballasting is removed so that the frame rises and is then towed back to the harbor or onshore assembly area for further use.

The method preferably also comprises the steps of detaching fixation means and especially TLP fixations means for fixation of the floating wind turbine offshore at the designated position from the floatable transportation and installation structure and/or the floating wind turbine and arranging them in such a way that they can be connected to the floating wind turbine for fixation of the same at the designated position.

BRIEF DESCRIPTION OF THE DRAWINGS

The aforementioned features and other features and advantages of the invention will be more fully understood from the following detailed description of certain embodiments of the invention, taken together with the accompanying drawings, which are meant to illustrate and not to limit the invention. The figures are schematically disclosing:

FIGS. 3-9 one embodiment of a method for transporting and installation of an offshore wind turbine according to the invention;

FIGS. 10-17 another embodiment of a method for transporting and installation of an offshore wind turbine according to the invention;

FIGS. 24-26 views of an embodiment of a floatable transportation and installation structure according to the invention.

DETAILED DESCRIPTION OF THE INVENTION

In the following for similar parts the same reference signs are used, wherein indices are provided, if necessary.

Figure 1:
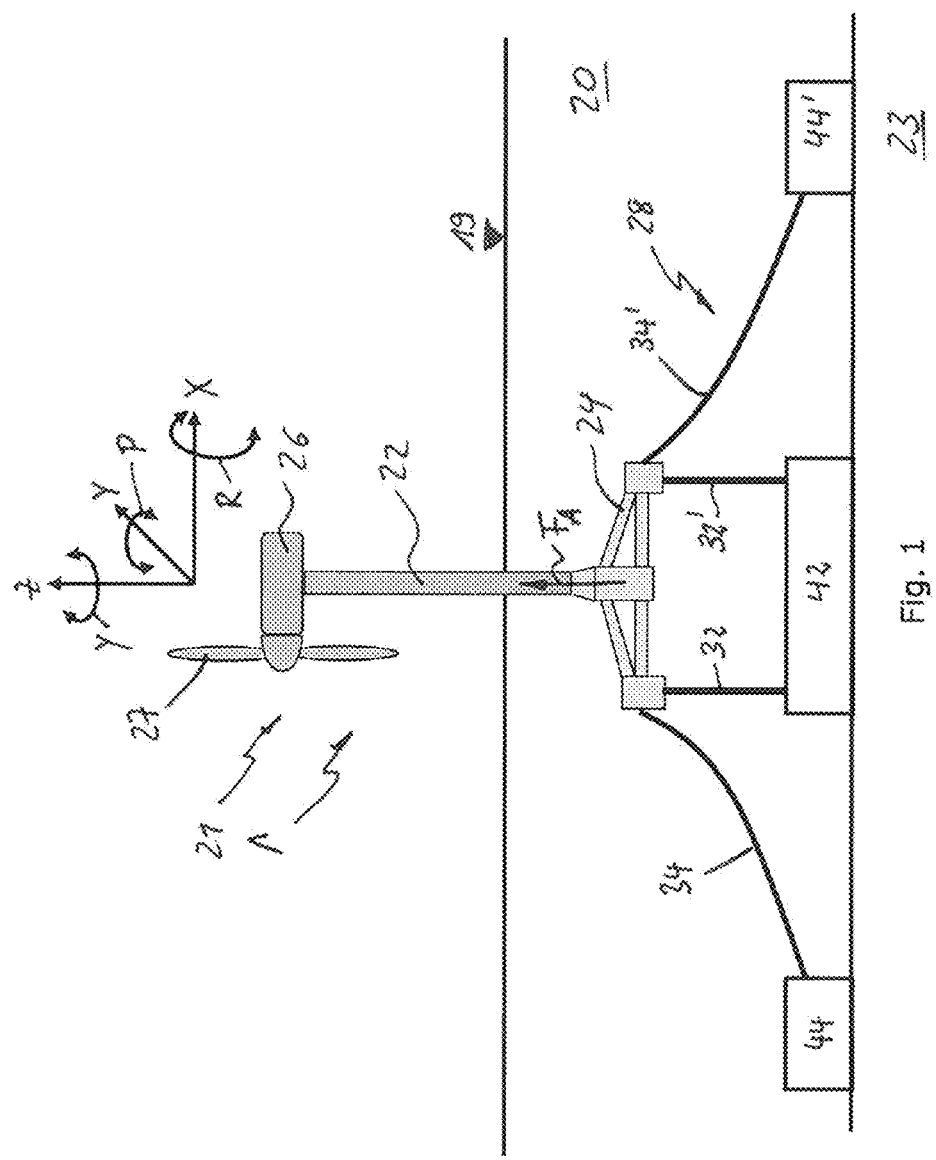
FIG. 1 a side view of one embodiment of a floating wind turbine comprising a TLP support structure.
Figure 2:
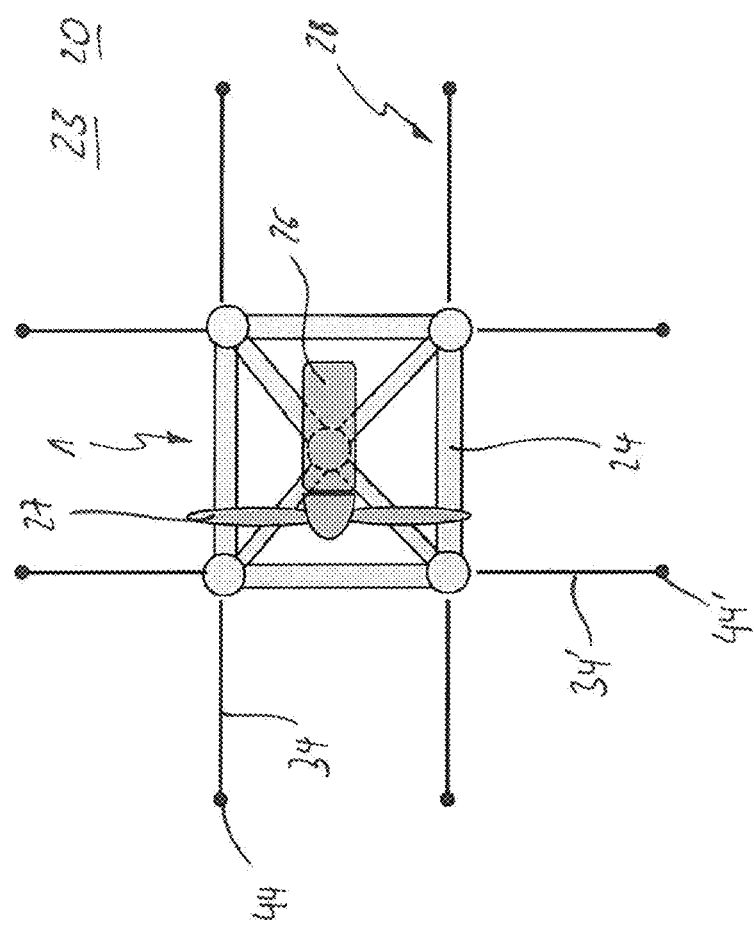
FIG. 2 top view of the floating wind turbine according to FIG. 1.

FIGS. 1 and 2 are schematically depicting one embodiment of a floating wind turbine 1 anchored to the sea bed 23 by fixation means 28 provided as a TLP support structure.

The wind turbine 1 is a wind turbine known by the state of the art, namely a horizontal axis wind turbine comprising a tower 22, where a nacelle 26 is attached to. The nacelle comprises rotor blades 27 which are turned by wind for generating energy.

The arrangement of tower 22, nacelle 26 and blades 27 are referred to as a wind turbine arrangement 21. This wind turbine arrangement is essentially fully assembled in a harbor as no additional lifting means and especially offshore cranes are necessary to bring the wind turbine 1 in a ready-to-operate state.

The wind turbine arrangement 21 and especially the tower 22 are attached to a floating support structure 24 providing buoyant forces to keep the wind turbine arrangement 21 in a sufficient operation high above sea level 19 and water 20 respectively.

As known such a floating wind turbine 1 is subjected to different movements and forces respectively due to weather and sea condition. The resulting movements are depicted in FIG. 1 as well indicated by respectively arrows X, Y and Z for surge, sway and heave movement, and R, P and Y for rotational movements, namely roll, pitch and yaw respectively.

To carry the resulting loads, the provided fixation means 28 and especially the here used TLP support structure provides catenary mooring lines 34 anchored to mooring anchoring means 44 and tendons 32 anchored to tendon anchoring means 42. Both, the tendon anchoring means and the mooring anchoring means are concrete volumes lowered to the sea bed 23. As the floating wind turbine 1 is enforcing a buoyancy force $F_A$ against this fixation means 28, the floating wind turbine 1 is secured at a position even under strong weathers.

FIGS. 3-9 are disclosing one method and arrangement for transportation and installation of a wind turbine, for example a wind turbine 1 as shown before.

As described before, the floating wind turbine 1 comprises a tower 22, a nacelle 26, where rotor blades 27 are attached to. These parts constitute the wind turbine arrangement 21 which is attached to a floating support structure 24. Like shown in FIG. 1 the floating support structure 24 provides buoyant forces $F_A$ to keep the floating wind turbine 1 in a floating position.

Figure 3:
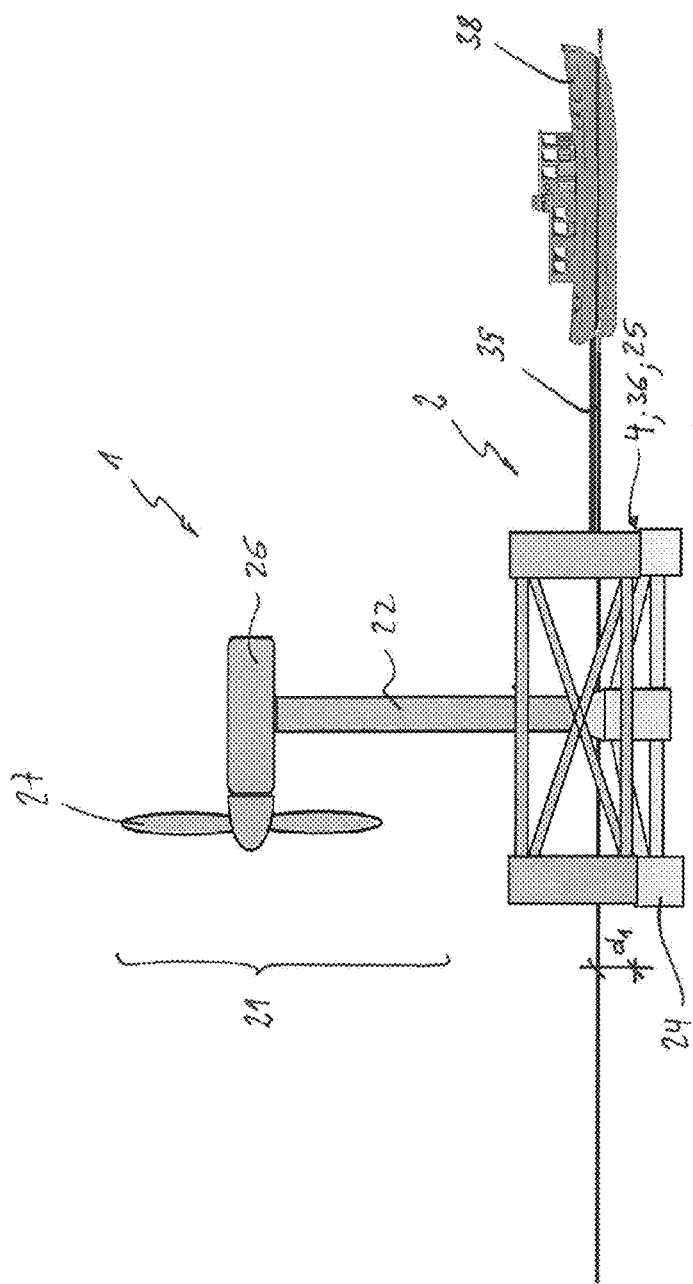

However, as this floating wind turbine 1 is built to be fixed to the sea bed 23 by fixation means and especially by a TLP structure (see FIG. 1), during transportation and especially in a non-fixed state it is unstable and therefore it normally cannot be transported in an erected and fully assembled way as shown in FIG. 3 without any aid means.

According to the invention, therefore a floatable transportation and installation structure 2 is provided the essentially fully assembled and erected floating wind turbine 1 is attached to by use of securing means 4 provided at the floatable transportation and installation structure and counter securing means 36 provided at the wind turbine 1.

The floatable transportation and installation structure 2 is attached to the floating wind turbine 1 in such a way that the floating wind turbine 1 is stabilized and can be moved by moving the transportation and installation structure 2. For this movement, a tugboat 38 is provided which is connected to the arrangement of floatable transportation and installation structure 2 and attached to floating wind turbine 1 by pulling means 39 and especially ropes or chains. As the floatable transportation and installation structure 2 provides additional buoyancy force, the erected and essentially fully assembled floating wind turbine 1 can be transported even under bad weather conditions in a safe and secure manner.

Figure 4:
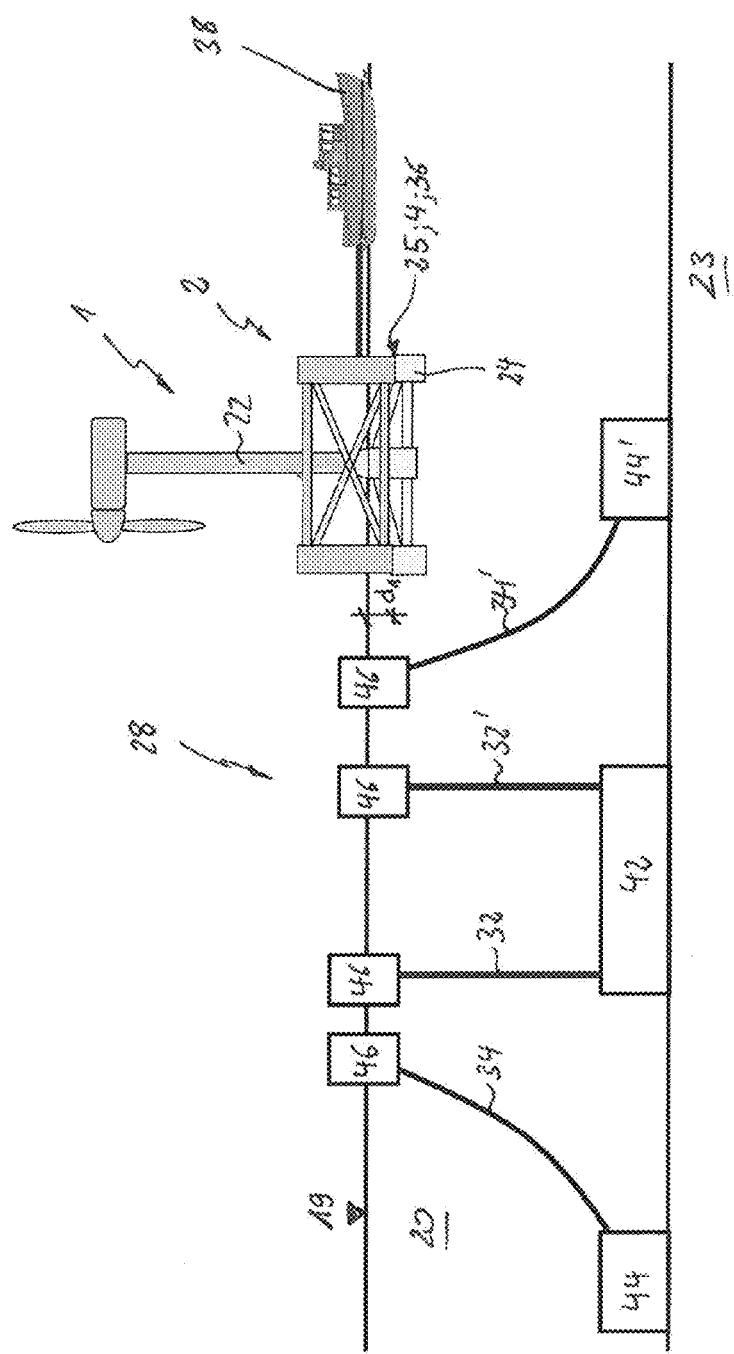

Like shown in FIGS. 3 and 4, the tugboat 38 pulls the arrangement of floatable transportation and installation structure 2 and floating wind turbine 1 to pre-arranged fixation means 28, which are built as a TLP support structure in this embodiment.

The fixation means 28 here comprise tendon anchoring means 42 and mooring anchoring means 44 lowered on the sea bed 23. Attached to the anchoring means 42 and 44 are tendons 32 and mooring lines 34 respectively. The tendons 32 and mooring lines 34 are held essentially e.g. at sea level or a required installation level by temporary buoyant means 46. In this embodiment the fixation means 28 has been arranged at the installation position of the floating wind turbine 1 by another tugboat (not shown) before the wind turbine 1 has been pulled to their installation position shown in FIG. 4.

As can be seen in FIGS. 3 and 4, the arrangement of floatable transportation and installation structure 2 and floating wind turbine 1 has been pulled by the tugboat 38 to the future installation position of the wind turbine 1. The floatable transportation and installation structure is thereby positioned on the top part 25 of the floating support structure 24 of the floating wind turbine 1 and secured to the tower 22 and/or the floating support structure 24, dependent on the provided securing means and counter securing means 4, 36.

Of course it is possible to attach the floatable support structure also to other parts of a floating wind turbine, especially when the turbine is a vertical axis turbine etc.

According to the combined buoyancy of the floatable transportation and installation structure 2 and the floating support structure 24, the floatable transportation and installation structure comprises in FIGS. 3 and 4 floating depth $d_1$.

Figure 5:
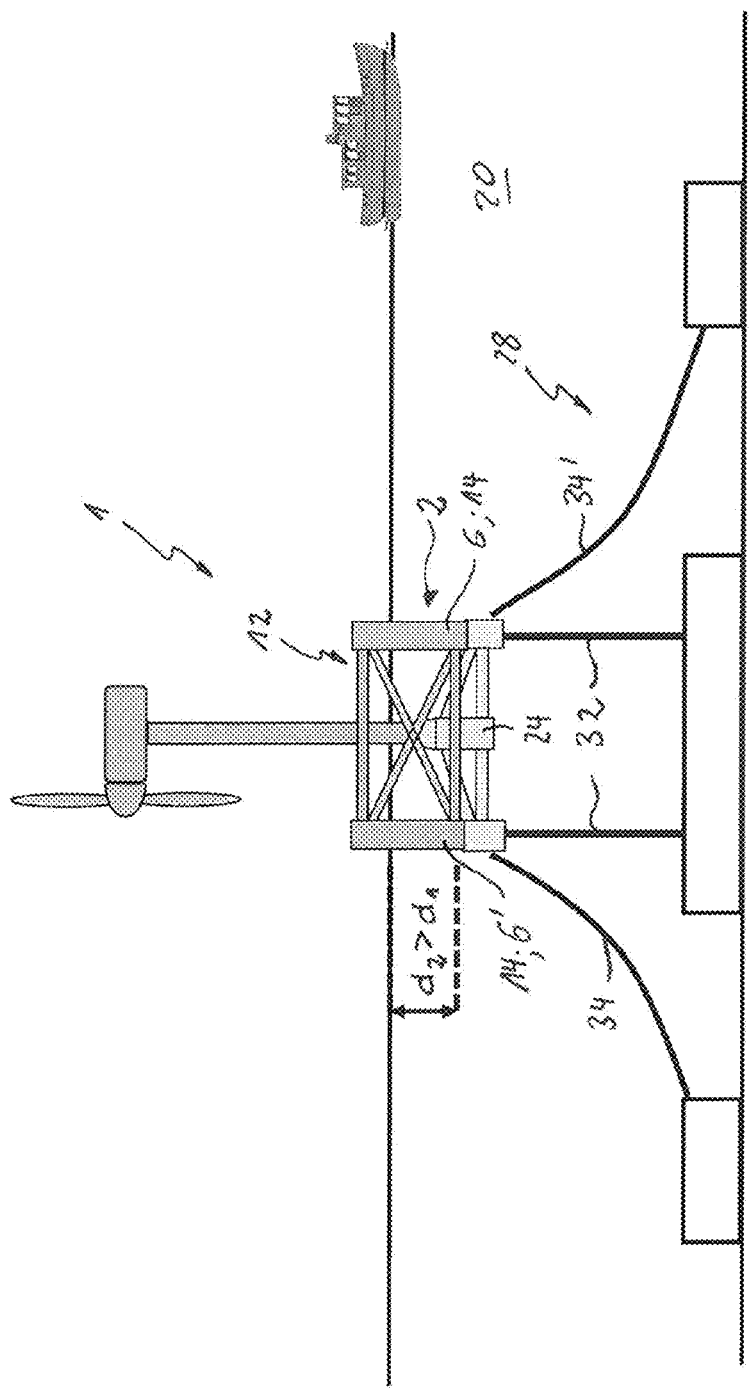

As shown in FIG. 5, after reaching the position where the floating wind turbine 1 has to be installed, the floating wind turbine 1 is going to be fixed to the fixation means 28 and especially to the tendons 32 and catenary mooring lines 34. For this the floatable transportation and installation structure 2 is ballasted by, according to this embodiment, pumping ballast and especially water 20 into ballasting and de-ballasting floating means 6. These ballasting means 6 are here provided as hollow chambers 14 and especially hollow tubes arranged within the frame structure 12 of the floatable transportation and installation structure 2. Preferably the floatable transportation and installation structure 2 and especially the ballastable floating means 6 comprise valves or similar apertures for taking and, for de-ballasting purpose, especially for ejecting water.

According to FIG. 5, by taking water the transportation and installation structure 2 is lowered to the floating depth $d_2 > d_1$ thereby also lowering the attached floating wind turbine 1 and their floating support structure 24. As an indicatory value, the floating depth $d_2$ of a floating wind turbine 1 according to this embodiment is about 10 to 25 m and especially 15 to 20 m in this state of the installation process.

As can also be seen in FIG. 5, according to the lowered floating depth of the floating support structure 24, the fixation means 28 and especially the tendons 32 and catenary mooring lines 34 can be easily attached to the floating support platform. For this reason the floating support structure 24 is lowered to such a depth that the fixation means and especially here the tendons 32 and the catenary mooring lines 34 can be attached without heavy normal forces acting on the tendons and the mooring lines respectively, and especially lowered until at least parts of the fixation means 28 are slack.

According to FIG. 6, after the floating wind turbine 1 and the floating support structure 24 respectively have been attached to the fixation means 28 and the mooring lines 34 and the tendons 32 respectively, the floatable transportation and installation structure 2 is detached from the floating wind turbine 1. For detaching the before mentioned securing means and counter securing means 4, 36 are loosened and the de-ballastable floating means 6 are de-ballasted, here by ejecting water. With regard to the fixation means 4; 36 it is also possible that the securing means 4; 36 are parts of a welding or similar connection, to be separated in this stage of the installation process e.g. by use of separating means like cutting or welding means etc.

Figure 9:
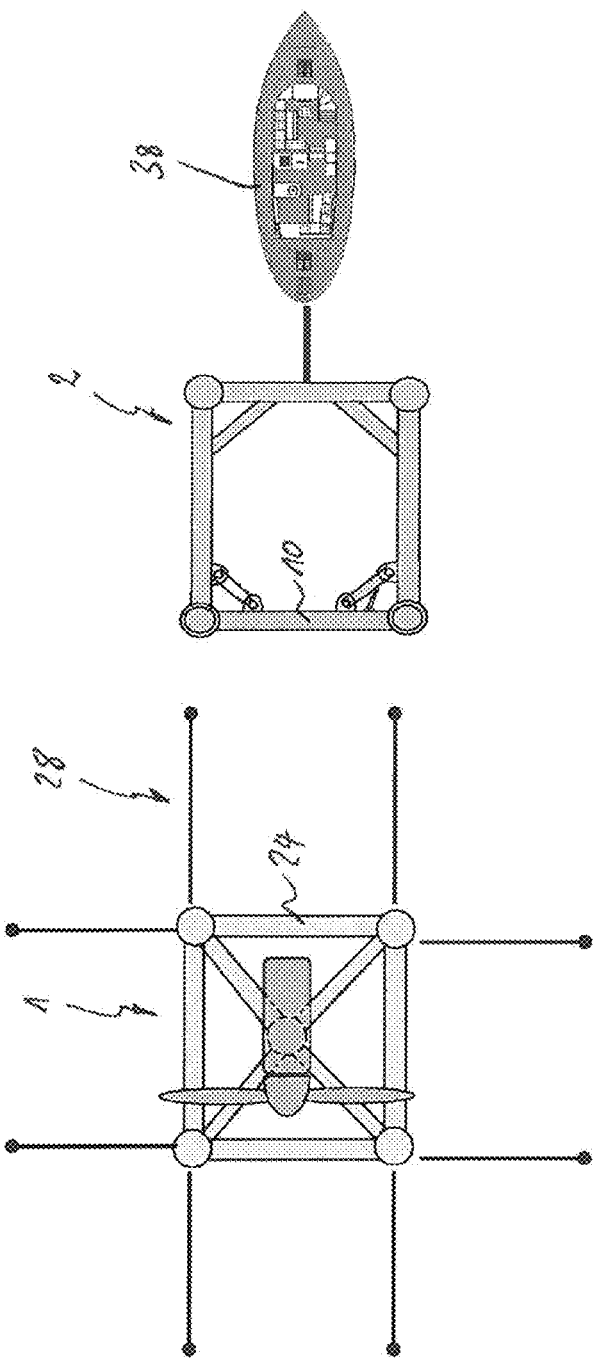
Figure 10:
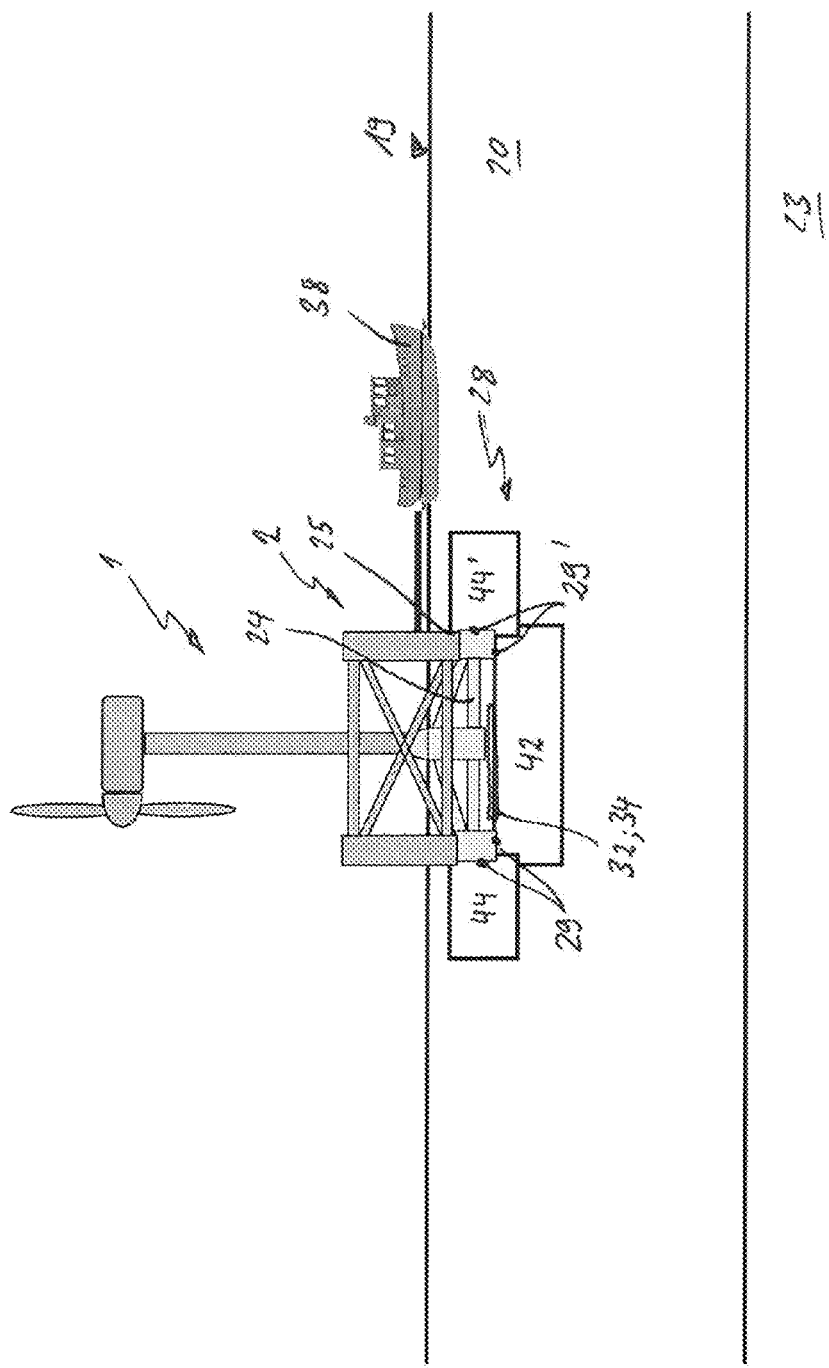
Figure 11:
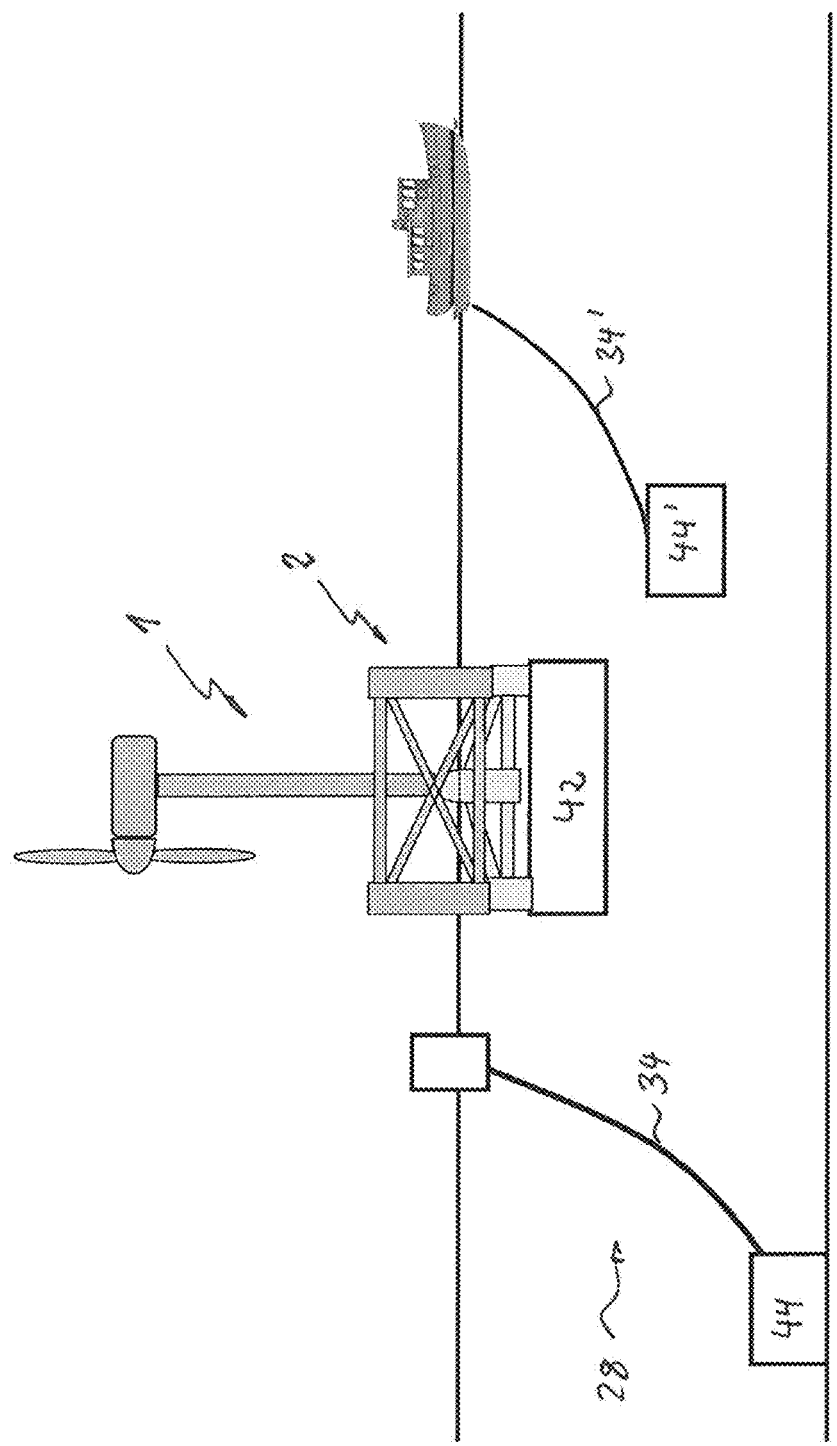

As a result the floatable transportation and installation structure 2 lifts away from the now fixed floating support structure 24 of the wind turbine 1, whereby the floating wind turbine rises within the limit of a slacking fixation means 28 bringing them into tension resulting in a secure fixation of the wind turbine 1 within the water 20. The floatable transportation and installation structure reaches a new floating depth $d_3<d_2$ FIGS. 7-9 are now disclosing removal of the detached floatable transportation and installation structure 2 according to FIG. 6.

In the here disclosed embodiment the floatable transportation and installation structure 2 comprises a gate structure 10, here an openable gate, preferable controllable by an electronic control station (not disclosed). For example, the activation means 11 for opening and closing the gate 10 could be hydraulic, electrical or any other activation means as they are known from the state of the art. Of course the activation means could also me manually controlled like snap bars, bolt connections etc.

In FIG. 7 the gate structure 10 is shown in a closed state enclosing an accommodation area 8, the wind turbine 1, and here as a special embodiment the tower 22 is accommodated and especially protected against environmental forces. After opening the gate 10 (see FIG. 8) the detached floatable transportation and installation structure 2 can be pulled away from the fixed floating wind turbine 1 without any need of lifting of the wind turbine and especially without any need of additional lifting means like cranes etc.

As shown in FIG. 9, the tugboat 38 is again connected to the floatable transportation and installation structure 2, its gate structure 10 is closed and the tugboat pulls the floatable transportation and installation structure preferably to a new side of operation and especially to an onshore place where a new wind turbine to be installed offshore is waiting for transportation. The installation and especially the fixation of the floating wind turbine 1 is finished.

FIGS. 10-17 are disclosing a second embodiment and especially a second method of transportation and installation wind turbine 1. The basic arrangement of a floatable transportation and installation structure 2 attached to a floatable wind turbine 1 and especially on top 25 of a floating support structure 24 of this wind turbine 1 is identical to the before mentioned embodiment. Therefore, to the before passages is referred for the sake of clarity.

However, the disclosed arrangement and method respectively differs from the before mentioned in that at least parts of the fixation system 28 are now attached to the arrangement of floatable transportation and installation structure 2 and/or the wind turbine 1 by provided attachment means 29 during transport by the tugboat 38.

In this special embodiment tendon anchoring means 42 and mooring anchoring means 44 are attached to the floating support structure 24 of the floating wind turbine 1 during transport. Furthermore, it is possible to also attach the respective tendons 32 and catenary mooring lines 34 which are, however, not shown here in detail. Furthermore, it is of course possible to attach any other parts of the fixation means 28 during transport.

After receiving the designated installation positions (see FIGS. 11 and 12), the fixation means 28 are arranged so that the floating wind turbine 1 can be attached to. For example the anchoring means 44, 42 are lowered to the sea bed 23 and attached to mooring lines 34 and tendons 32. Again, temporarily buoyant means 46 are used, at least partly here, which of course could also have been connected to the floatable transportation and installation structure 2 or the floating wind turbine 1 during transport. Also, it is of course possible to transport these means on the tugboat etc.

Figure 12:
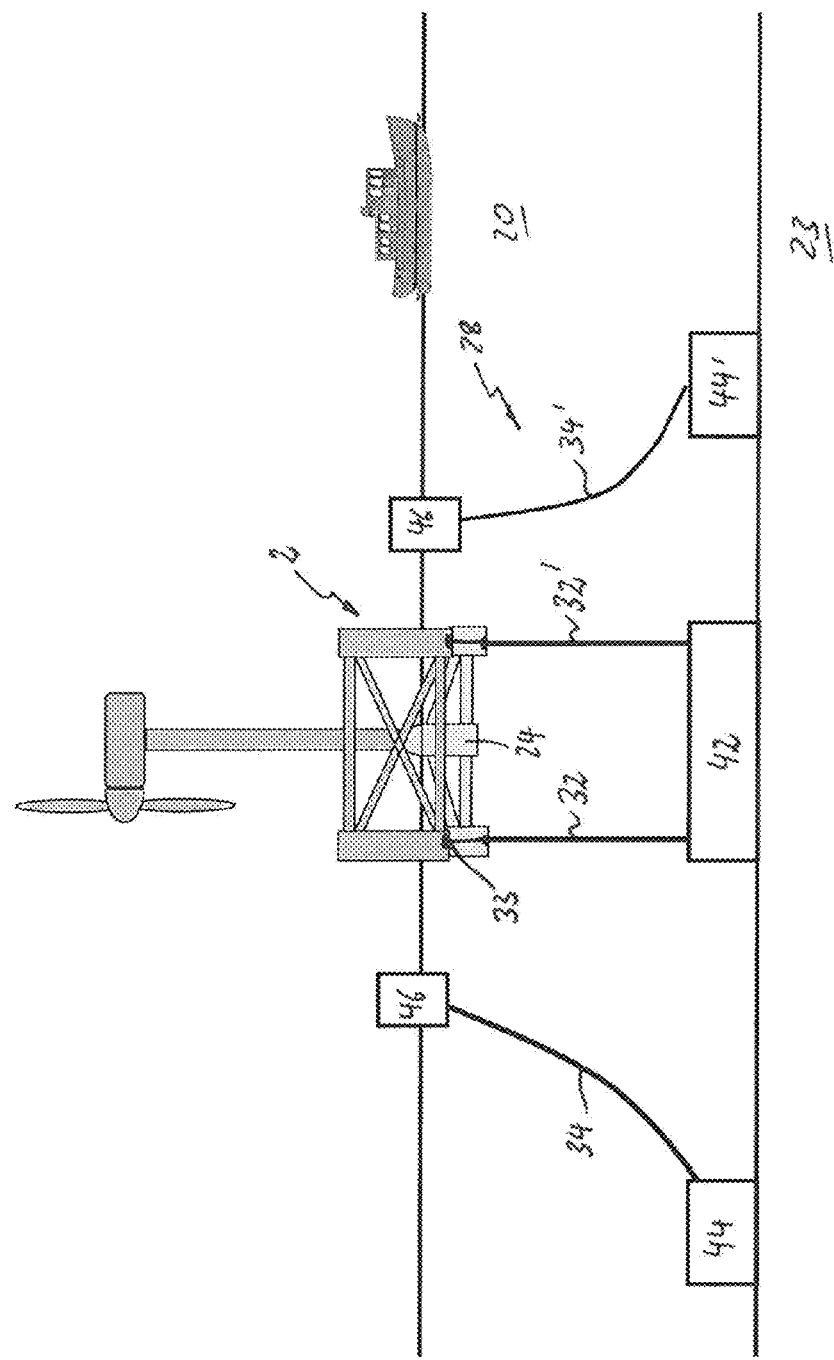

As shown in FIG. 12, in this embodiment the tendon anchoring mean 42 is lowered to the sea bed 23 by winches 33 arranged at the floatable transportation and installation structure 2. Of course, the winches could also be provided at the floating support structure 24.

Figure 13:
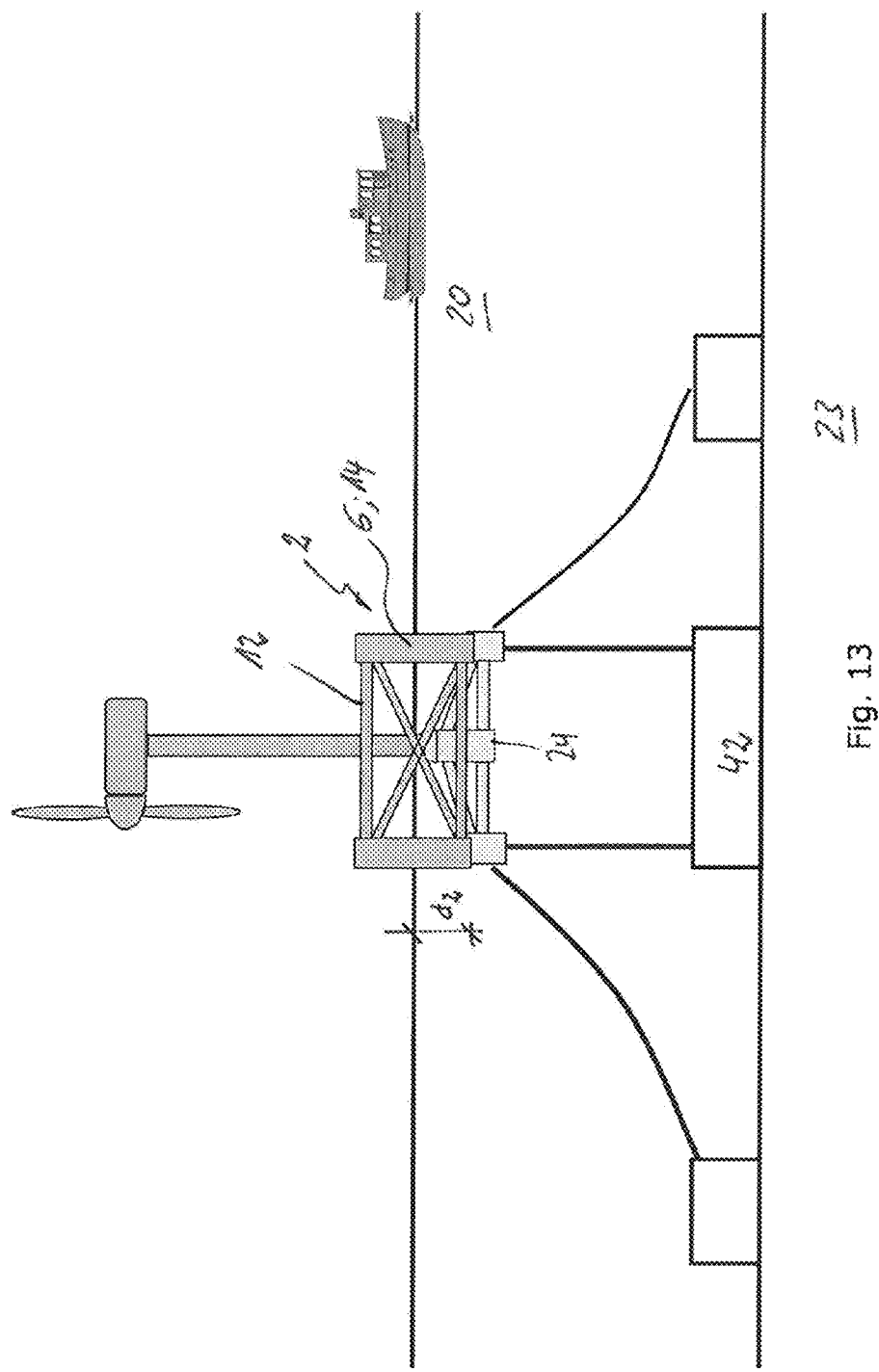

As shown in FIG. 13 after lowering the tendon anchoring means 42 to the sea bed 23, the floatable transportation and installation structure 2 is ballasted by taking water 20 into the ballastable floating means 6 and especially the hollow chambers 14 of the frame structure 12. The result is an increased floating depth $d_2$. In detail, the floating support structure 24 is lowered a bit below normal installation depth.

After lowering the anchoring means tendons 32 and catenary mooring lines 34 are connected to the floating support structure 24.

Figure 14:
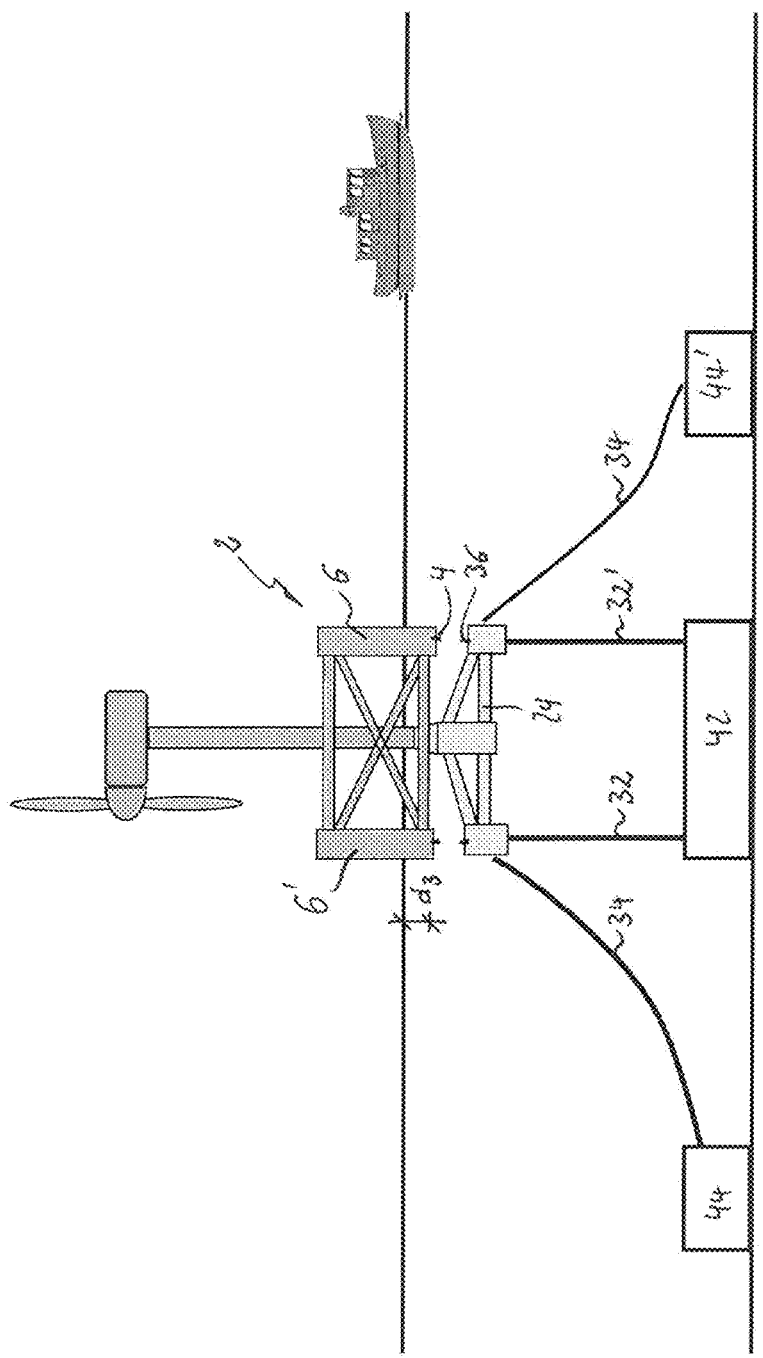

As described before with regards to the first embodiment described and now again shown in FIGS. 14-17, the floatable transportation and installation structure 2 is detached from the floating wind turbine 1, the de-ballastable floating means 6 are emptied, here e.g. by ejecting water 20, so that the floatable transportation and installation structure 2 lifts up to a floating depth $d_3$ (see FIG. 14).

Preferably the detaching operation comprises the following steps: ballast water is pumped out of the floatable transportation and installation structure 2 and especially out of the de-ballastable floating means 6 until the floating wind turbine 1 reaches final installation position. Successively, the floatable transportation and installation structure 2 is detached from the floating wind turbine 1, wherein especially the securing and counter securing means 4, 36 are opened. Finally, extra ballast water is ejected from the de-ballastable floating means 6 until the floatable transportation and installation structure 2 reaches required transportation depth.

Figure 17:
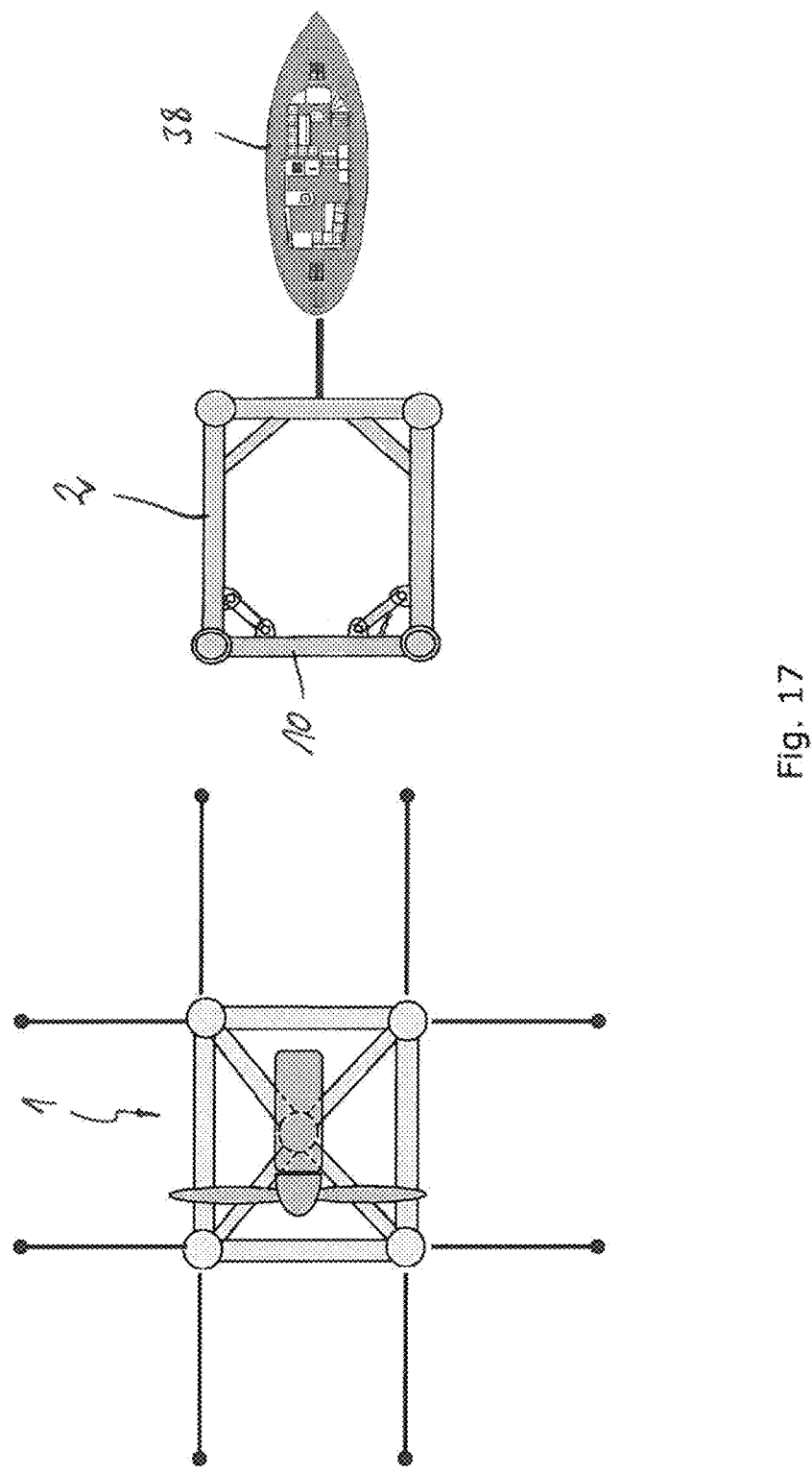

After that the floatable transportation and installation structure 2 is pulled away, as shown in FIGS. 15-17, by performing identical steps as explained before in FIGS. 3-9.

Again, one side of the floatable transportation and installation structure 2 and here in this special embodiment a gate 10 is opened by use of hydraulic cylinders. As mentioned, also other activation means could be used. After opening the gate structure 10, the tugboat 38 pulls the floatable transportation and installation structure 2 away from the floating turbine 1. The gate structure 10 is being closed and the floatable transportation and installation structure 2 is been towed back to port or another operation position.

Figure 19:
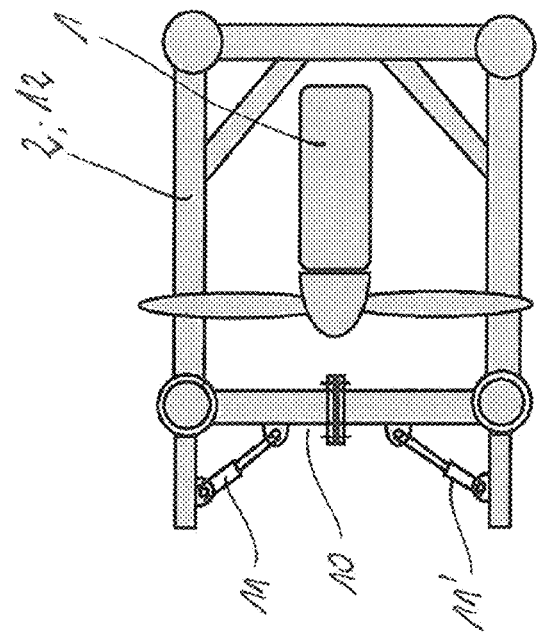
FIGS. 18 and 19 a top view of an embodiment of a floatable transportation and installation structure according to the invention.
Figure 18:
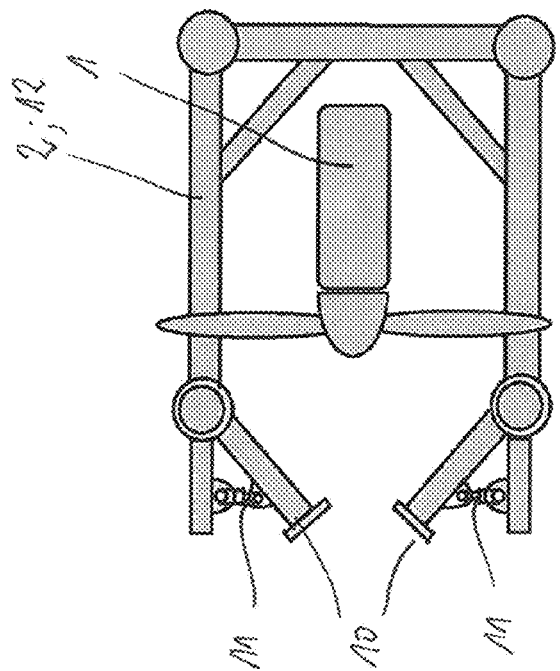

FIGS. 18 and 19 are disclosing another embodiment of a floatable transportation and installation structure 2 also comprising a frame structure 12 and having a gate structure 10 on one side of the structure 2. Hydraulic, electrical or any other activation means 11 are used for opening and closing the gate structure 10. Of course the means 11 could also be provided as supporting means, as hydraulic dampers, wherein the gate-parts 10 are opened and closed manually.

Similar embodiments are disclosed by FIGS. 20 and 21, again constituted as a frame and lattice structure respectively comprising a three-angular form. Again, the floatable transportation and installation structure 2 comprises an accommodation area 8 for accommodating the floating wind turbine 1, wherein both embodiments comprising a gate structure 10 open and closable by a hydraulic or other activator means 11. With the one embodiment disclosed in FIG. 20, the activator means 11 is arranged on the outside of the accommodation area 8, wherein with the embodiment according to FIG. 21 it is arranged within the accommodation area.

The frame structure 12 could preferably generally be built in such a way that by use of different parts 16, 17, 10 and especially frame-like parts different sizes and/or geometries of the floatable transportation and installation structure 2 can be provided. In such a way, different floating wind turbines 1 can be accommodated in the accommodating area and transported. Of course, it is possible for example to reduce the length of gate structure 10 or to provide adapted parts 16 and 17 for adapting the size and the kind of the floatable transportation and installation structure 2.

Figure 20:
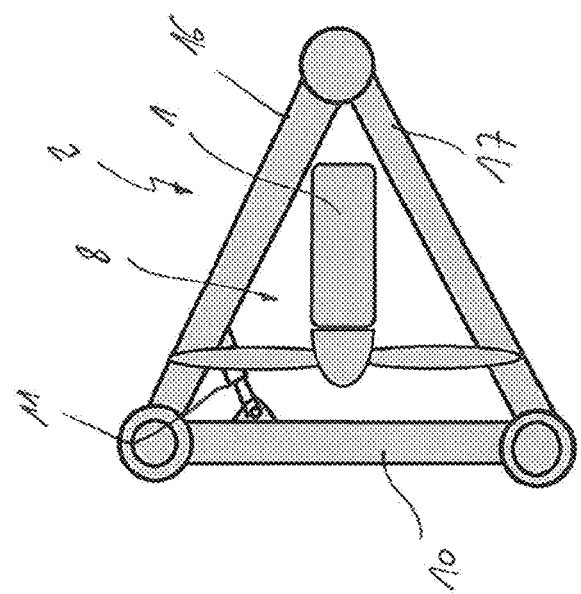
FIG. 20 a top view of an embodiment of a floatable transportation and installation structure according to the invention.
Figure 21:
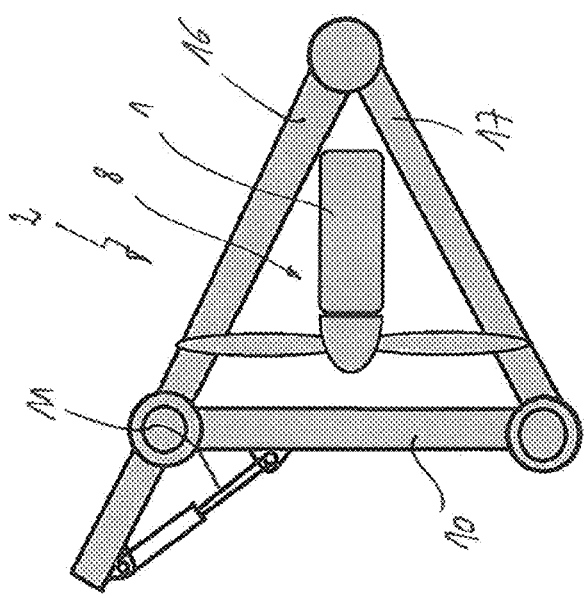
FIG. 21 a top view of an embodiment of a floatable transportation and installation structure according to the invention.
Figure 23:
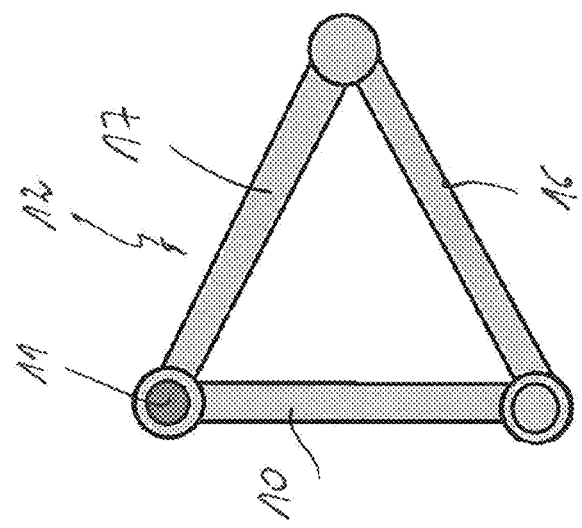
FIGS. 22 and 23 a top view of an embodiment of a floatable transportation and installation structure according to the invention.
Figure 22:
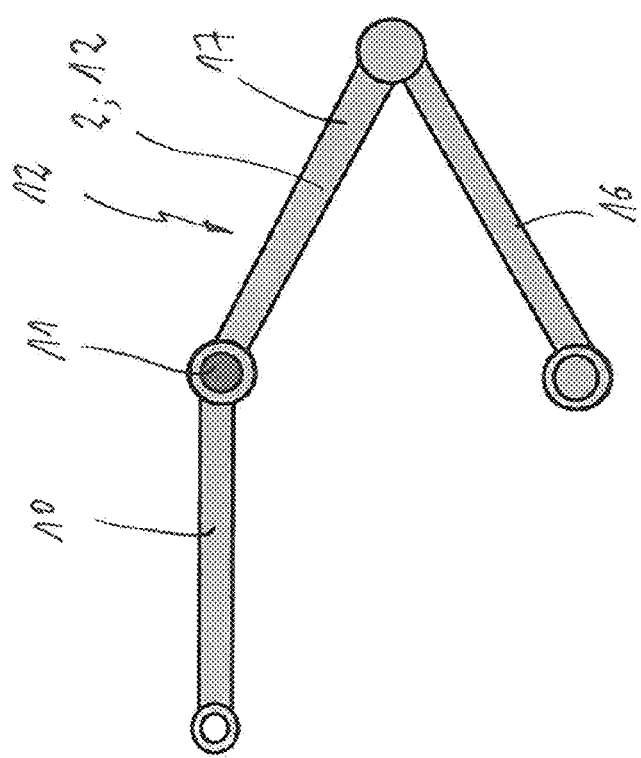

FIGS. 22 and 23 are disclosing another embodiment of a floatable transportation and installation structure similar to the embodiment of FIGS. 20 and 21. Here, the gate structure 10 is activated by an activation mean 11 provided as a yaw motor, a hydraulic motor etc.

By use of these different embodiments of the floatable transportation and installation structure and especially by building it as a modular structure comprising multiple parts 16, 17 and especially frame-like parts 12, being at least partially attachable with each other for adapting the floatable transportation and installation structure 2 for transportation and installation of different kind of floating wind turbines, a very effective and multi-purpose arrangement is provided.

Wherein the before mentioned embodiments are more focusing on the frame structure 12 of the floatable transportation and installation structure 2, FIGS. 24-26 are disclosing an embodiment of a floatable transportation and installation structure 2, wherein especially the securing means 4 and counter securing means 36 are depicted.

FIG. 23 discloses a side view of a tower 22 of a floating wind turbine (not shown) attached to the floatable transportation and installation structure 2. The tower 22 comprises counter securing means 36 where securing means 4 of the floatable transportation and installation structure 2 can be attached to.

As can be seen in FIG. 25, the embodiment of the floatable transportation and installation structure is further specified by the fact that a gate structure 10 for enclosing and opening an accommodation area 8 is part of the securing means 4 too, activated by activator means 11.

Preferably it is possible to provide a frame structures 48 of the securing means 4 as adapter means 30 so that they can be adapted to different kind of floating wind turbines and here especially towers 22.

Needless to say that also other adapter means especially for connecting the floatable transportation and installation structure 2 to a floating wind turbine 1 and especially to their floating support structure 24 can be used.

REFERENCE SIGNS

1 wind turbine
2 floatable transportation and installation structure
4 securing means
6 ballastable and de-ballastable floating means
8 accommodation area
10 gate structure
11 activation mean
12 lattice structure, frame structure
14 hollow chambers
16 part
17 part
19 sea level
20 water
21 wind turbine arrangement
22 tower
23 sea bed
24 floating support structure
25 top part of floating support structure
26 nacelle
27 rotor blades
28 fixation means
29 attachment means
30 adapter means
32 tendon
33 winch
34 mooring line
36 counter securing means
38 tugboat
39 pulling means
42 tendon anchoring means
44 mooring anchoring means
46 temporary buoyant means
48 frame structure
$d_1$ floating depth
$d_2$ floating depth
$d_3$ floating depth
$F_A$ buoyancy force
X surge
Y sway
Z heave
R roll
P pitch
Y yaw

The invention claimed is:

1. A floatable transportation and installation structure for transportation and installation of an essentially fully assembled and erected floating wind turbine, wherein said transportation and installation structure has a floating depth and the floating wind turbine has a floating depth, wherein floating depth is defined as the distance between the surface of a body of water and the bottom of a floating structure, and wherein said transportation and installation structure comprises:
   securing means for detachably and temporarily securing the floatable transportation and installation structure to the erected floating wind turbine in such a way that the floating wind turbine is stabilized and can be moved by moving the transportation and installation structure,
   an accommodation area where the floating wind turbine can be accommodated in such a way that the floatable transportation and installation structure is at least partially enclosing the floating wind turbine,
   at least one opening-closing structure or similar gate structure for reversibly fully enclosing the accommodation area around the secured floating wind turbine, and
   ballastable and de-ballastable floating means comprising a plurality of hollow vertical members in fluidic communication with a plurality of tubular cross members, wherein the ballastable and de-ballastable floating means is configured in such a way that the floating depth of the floatable transportation and installation structure is changed by ballasting and de-ballasting the floating means respectively, and by taking water and/or ejecting water respectively, in a situation where the floatable transportation and installation structure is secured to the floating wind turbine and/or in a situation where the floatable transportation and installation structure is separated from the floating wind turbine, wherein in a situation where the floatable transportation and installation structure is secured to the floating wind turbine, the change in the floating depth of the wind turbine is equal to the change in the floating depth of the floatable transportation and installation structure.

2. A floatable transportation and installation structure according to claim 1, characterized in that the floatable transportation and installation structure is built in such a way that the floatable transportation and installation structure is positionable and/or securable at least partially on a top part of a floating support structure of the wind turbine.

3. A floatable transportation and installation structure according to claim 1, further comprising a frame structure and a lattice structure.

4. A floatable transportation and installation structure according to claim 1, characterized in that the floatable transportation and installation structure is reusable for transportation and installation of multiple floating wind turbines.

5. A floatable transportation and installation structure according to claim 1, characterized in that the floatable transportation and installation structure is build as a modular structure comprising multiple parts and frame-like parts, being at least partially attachable with each other for adapting the floatable transportation and installation structure for transportation and installation of different kind of floating wind turbines.

6. A floatable transportation and installation structure according to claim 1, further comprising adapter means for securing different kind of floating wind turbines for transportation and installation.

7. A floatable transportation and installation structure according to claim 1, further comprising attachment means for at least temporarily attaching at least parts of fixation means, by which the floating wind turbine can be fixed at an installation position offshore, during transportation to this position.

8. A floating wind turbine, comprising counter securing means connectable to securing means of a floatable transportation and installation structure for transportation and installation of the floating wind turbine, wherein the floatable transportation and installation structure has a floating depth and the floating wind turbine has a floating depth, wherein floating depth is defined as the distance between the surface of a body of water and the bottom of a floating structure, and wherein said transportation and installation structure comprises:
  securing means for detachably and temporarily securing the floatable transportation and installation structure to the floating wind turbine in such a way that the floating wind turbine is stabilized and can be moved by moving the transportation and installation structure,
  an accommodation area where the floating wind turbine can be accommodated in such a way that the floatable transportation and installation structure is at least partially enclosing the floating wind turbine,
  at least one opening-closing structure or similar gate structure for reversibly fully enclosing the accommodation area around the secured floating wind turbine, and
  ballastable and de-ballastable floating means comprising a plurality of hollow vertical members in fluidic communication with a plurality of tubular cross members, wherein the ballastable and de-ballastable floating means is configured in such a way that the floating depth of the floatable transportation and installation structure is changed by ballasting and de-ballasting the floating means respectively, and by taking water and/or ejecting water respectively, in a situation where the floatable transportation and installation structure is secured to the floating wind turbine and/or in a situation where the floatable transportation and installation structure is separated from the floating wind turbine, wherein in a situation where the floatable transportation and installation structure is secured to the floating wind turbine, the change in the floating depth of the wind turbine is equal to the change in the floating depth of the floatable transportation and installation structure.

9. A floating wind turbine according to claim 8, further comprising a floating support structure and at least one wind turbine arrangement attached to the floating support structure, wherein the floating support structure is not comprising ballasting and de-ballasting means and is not ballastable and de-ballastable by taking and/or ejecting water or similar ballast means.

10. A floating wind turbine according to claim 8, further comprising attachment means for at least temporarily attaching at least parts of fixation means, by which the floating wind turbine can be fixed at an installation position offshore, during transportation to this position.

11. A method for transportation and installation of an almost fully assembled and erected floating wind turbine, wherein the floating wind turbine has a floating depth, wherein floating depth is defined as the distance between the surface of a body of water and the bottom of a floating structure, the method comprising:
  securing the essentially fully assembled and erected floating wind turbine to a floatable transportation and installation structure at an accommodation area of the floatable transportation and installation structure, wherein the floatable transportation and installation structure has ballasting and de-ballasting means comprising a plurality of hollow vertical members in fluidic communication with a plurality of tubular cross members, wherein the essentially fully assembled and erected floating wind turbine is secured to the floatable transportation and installation structure in such a way that the erected floating wind turbine is stabilized and can be moved by moving the transportation and installation structure and wherein the floating wind turbine is accommodated at the accommodation area in such a way that the floatable transportation and installation structure is at least partially enclosing the floating wind turbine wherein the accommodation area around the floating wind turbine is reversibly essentially fully enclosed by at least one opening-closing structure or similar gate structure, and wherein the transportation and installation structure has a floating depth;
  moving the floating wind turbine to a designated position by moving the floatable transportation and installation structure to said designated position;
  securing the floating wind turbine to fixations means provided at the given position;
  detaching the transportation and installation structure from the now fixed floating wind turbine and separating the floatable transportation and installation structure from the wind turbine, wherein the opening-closing structure or similar gate structure, which is essentially fully enclosing the accommodation area, is opened;
  ballasting the floatable transportation and installation structure in such a way that the attached floating wind turbine is lowered further into the water, wherein the change in the floating depth of the wind turbine is equal to the change in the floating depth of the floatable transportation and installation structure;
  securing the lowered floating wind turbine to fixations means;
  separating the lowered floatable transportation and installation structure from the fixed floating wind turbine; and de-ballasting the floatable transportation and installation structure in such a way that the floatable transportation and installation structure is lifted in the water.

12. A method for transportation and installation according to claim 11, further comprising:
at least partly detaching and arranging fixation means, and tension leg platform ("TLP") fixation means for fixation of the floating wind turbine at the designated offshore position, from the floatable transportation and installation structure and/or the floating wind turbine in such a way that they can be connected to the floating wind turbine for fixation of the floating wind turbine.

* * * * *